(12) United States Patent
Tezuka

(10) Patent No.: US 8,175,343 B2
(45) Date of Patent: May 8, 2012

(54) IMAGING DEVICE, IMAGE PROCESSING DEVICE, CONTROL METHOD, AND PROGRAM

(75) Inventor: Tadanori Tezuka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1055 days.

(21) Appl. No.: 12/027,057

(22) Filed: Feb. 6, 2008

(65) Prior Publication Data

US 2008/0187187 A1 Aug. 7, 2008

(30) Foreign Application Priority Data

Feb. 7, 2007 (JP) ................................. 2007-027507

(51) Int. Cl.
*G06K 9/00* (2006.01)

(52) U.S. Cl. ......................... 382/118; 382/103; 382/199

(58) Field of Classification Search .................. 382/103, 382/118, 199
See application file for complete search history.

(56) References Cited

U.S. PATENT DOCUMENTS

| 2003/0063778 A1* | 4/2003 | Rowe et al. ................. 382/115 |
| 2003/0071908 A1* | 4/2003 | Sannoh et al. ............... 348/345 |
| 2004/0227964 A1* | 11/2004 | Fujino ............................ 358/1.9 |
| 2005/0102246 A1* | 5/2005 | Movellan et al. .............. 706/12 |
| 2007/0201747 A1* | 8/2007 | Yamada et al. ............... 382/199 |
| 2007/0263909 A1 | 11/2007 | Ojima et al. |
| 2007/0263933 A1 | 11/2007 | Ojima et al. |
| 2007/0263934 A1 | 11/2007 | Ojima et al. |
| 2007/0263935 A1 | 11/2007 | Sanno et al. |
| 2007/0268370 A1 | 11/2007 | Sanno et al. |
| 2008/0187185 A1* | 8/2008 | Misawa et al. ............... 382/118 |
| 2008/0187187 A1* | 8/2008 | Tezuka ............................ 382/118 |
| 2011/0007975 A1* | 1/2011 | Kazama et al. ............... 382/225 |

FOREIGN PATENT DOCUMENTS

| JP | 2000-200345 | 7/2000 |
| JP | 2003-107335 | 4/2003 |
| JP | 2003-127489 | 5/2003 |

OTHER PUBLICATIONS

Ueno, "Face Region Detection for Television Phone and its Effects", *Image Lab*, Japan Industrial Publishing Co., Ltd., 1991 (including partial English translation).
Agui, "Extraction of Face Regions from Monochromatic Photographs", *The Journal of IEICE*, vol. J74-D-II, No. 11, pp. 1625-1627, 1991 (including partial English translation).
Matsuhashi et al., "A Proposal of the Modified HSV Colour System Suitable for Human Face Extraction", *The Journal of the Institute of Television Engineers of Japan*, vol. 49, No. 6, pp. 787-797, 1995 (including partial English translation).

* cited by examiner

*Primary Examiner* — Gregory M Desire
(74) *Attorney, Agent, or Firm* — Wenderoth Lind & Ponack, L.L.P.

(57) ABSTRACT

An imaging device supports the taking of an image with a suitable composition without requiring user operation. The imaging device detects, using a face detection circuit, face regions of faces in an image input from the image input unit. When a plurality of face regions have been detected, the imaging device, using the selection unit, judges, for each of the detected face regions, whether a face region overlaps with any of the first through fourth judgment frames that are defined by two types of golden ratios. When it judges that the face region overlaps with any of the first through fourth judgment frames, the imaging device assigns to the face regions, and selects a face region corresponding to the largest weight as the main object.

18 Claims, 18 Drawing Sheets

| Judgment frame | Start point | End point |
|---|---|---|
| 401 — 1st judgment frame | (300, 0) | (360, 600) |
| 402 — 2nd judgment frame | (540, 0) | (600, 600) |
| 403 — 3rd judgment frame | (0, 200) | (900, 240) |
| 404 — 4th judgment frame | (0, 360) | (900, 400) |

|   |   | x1 | y1 | x2 | y2 | Evaluation value (wgi) |
|---|---|---|---|---|---|---|
| 1 | First face region | 60 | 330 | 140 | 420 | 1.2 |
| 2 | Second face region | 370 | 250 | 470 | 380 | 1.2 |
| 3 | Third face region | 530 | 130 | 630 | 250 | 1.4 |

|   |                    | x1  | y1  | x2  | y2  | Area (wsi) |
|---|--------------------|-----|-----|-----|-----|------------|
| 1 | First face region  | 60  | 330 | 140 | 420 | 7200       |
| 2 | Second face region | 370 | 250 | 470 | 380 | 13000      |
| 3 | Third face region  | 530 | 130 | 630 | 250 | 12000      |

|   |                    | x1  | y1  | x2  | y2  | Area (wsi) | Weighting coefficient (wpi) |
|---|--------------------|-----|-----|-----|-----|------------|------------------------------|
| 1 | First face region  | 60  | 330 | 140 | 420 | 7200       | 1.2                          |
| 2 | Second face region | 370 | 250 | 470 | 380 | 13000      | 1.2                          |
| 3 | Third face region  | 530 | 130 | 630 | 250 | 12000      | 1.4                          |

|   |                    | x1  | y1  | x2  | y2  | Area (wsi) | Weighting coefficient (wpi) | Evaluation value (wi) |
|---|--------------------|-----|-----|-----|-----|------------|------------------------------|------------------------|
| 1 | First face region  | 60  | 330 | 140 | 420 | 7200       | 1.2                          | 8640                   |
| 2 | Second face region | 370 | 250 | 470 | 380 | 13000      | 1.2                          | 15600                  |
| 3 | Third face region  | 530 | 130 | 630 | 250 | 12000      | 1.4                          | 16800                  |

1001 Detected range
1002 Center point

1003 Eye position

IMAGING DEVICE, IMAGE PROCESSING DEVICE, CONTROL METHOD, AND PROGRAM

This application is based on an application No. 2007-027507 filed in Japan, the content of which is hereby incorporated by reference.

BACKGROUND OF THE INVENTION (1) Field of the Invention

The present invention relates to an imaging device (such as a digital camera or a digital video camera) and an image processing device that have a function to detect face regions of objects, and relates to a control method of the devices.

(2) Description of the Related Art

Proposed by some of conventional imaging devices are technologies of detecting a face region from a photographed image based on a predetermined algorithm, and performing various processes onto the detected face region by regarding it as the main object.

For example, Patent Document 1 discloses an automatic focus control (hereinafter referred to as AF control) performed onto a detected face region. Also, Patent Document 2 discloses setting imaging conditions, such as an automatic exposure control (hereinafter referred to as AE control), based on the detected face region, as well as the AF control.

The following describes the flow of a conventional AF control process with face detection.

First, the imaging device performs a face detection process when it is in a face detection operation mode. Methods of detecting faces are disclosed in, for example, Non-patent Documents 1 through 3, which Patent Document 1 refers to.

After detecting faces in the face detection process, the imaging device checks whether a plurality of faces have been detected. The imaging device performs a single face process when a single face has been detected. And when a plurality of faces have been detected, the imaging device checks whether a distance measuring area selection mode, which a target face for the AF control is selected by user operation, has been set. When the distance measuring area selection mode has been set, the imaging device displays a GUI on the liquid crystal monitor so that the user can select a face. The user selects a face that should be subjected to the AF control. The imaging device sets a distance measuring area to the user-selected face, and performs the AF control onto the distance measuring area. When the distance measuring area selection mode has not been set, the imaging device sets the distance measuring area to a face that is closest to the center of the image, and performs the AF control onto the face.

As described above, when an imaging device using such a conventional face detection method has detected a plurality of faces, it selects, as the face of the main object, a face that is closest to the center of the image or makes the user select a face among them.

Patent Document 1: Japanese Patent Application Publication No. 2003-107335

Patent Document 2: Japanese Patent Application Publication No. 2003-127489

Non-patent Document 1: "A Proposal of the Modified HSV Colour System Suitable for Human Face Extraction", the Journal of the Institute of Television Engineers of Japan, Vol. 49, No. 6, pp. 787-797, 1995

Non-patent Document 2: "Extraction of Face Regions from Monochromatic Photographs", the Journal of IEICE, Vol. J74-D-II, No. 11, pp. 1625-1627, November 1991

Non-patent Document 3: "Face region detection for television phone and its effects", Image Lab, November 1991, Japan Industrial Publishing Co., Ltd.

SUMMARY OF THE INVENTION

There are sometimes cases where a user would like to take a picture of a row of three persons in a composition, where the main object is a person at the far right, and the AF control should be performed onto a face of the main object. In such cases, in a conventional technology a face of a person near the center is automatically selected as the face of the main object, and the AF control is performed onto the selected face, when the distance measuring area selection mode has not been set. Contrary to the intention of the user, the taken picture does not have a suitable composition where the person who the user desires to be the main object is not the main object. To take a picture with a suitable composition, the user should set the distance measuring area selection mode and directly select the main object.

That is to say, according to conventional methods of detecting the main object, when a face of a person to be the main object is not located near the center, the imaging device requires a user's operation to take a picture with a suitable composition. However, some users consider such an operation of selecting the face troublesome.

The object of the present invention is therefore to provide an imaging device, image processing device, imaging device control method, and program that support to take an image with a suitable composition without requiring user's operation.

The above object is fulfilled by an imaging device for supporting to take an image with a suitable composition in accordance with a golden ratio, the imaging device comprising: an imaging mechanism operable to generate an image from incident light to satisfy a first imaging control condition; a storage unit storing at least one piece of region information each of which indicates a boundary region located, in an image frame, between two golden section lines determined by two types of golden ratios; a detection unit operable to detect one or more face regions, which are recognized as face portions of imaging objects, from the image generated by the imaging mechanism; a weighting unit operable to, when the detection unit has detected a plurality of face regions, assign weights to each of the detected face regions depending on overlapping of each face region with the boundary region indicated by the region information, and obtain an evaluation value of each of the face regions; a selection unit operable to select one face region as a face portion of a main imaging object from among the plurality of face regions, in accordance with the evaluation value of each of the face regions; and an imaging control unit operable to control the imaging mechanism to generate an image to satisfy a second imaging control condition that is determined according to the selected face region.

With the above-stated structure, when a plurality of face regions are detected, the imaging device assigns weights to each of the detected face regions using the boundary region and selects one face region as a face portion of a main imaging object, where the selection of the face region is based on the evaluation values that are obtained using the weights assigned to the face regions. Generally known in the fields of photography and the like is the fact that, when an object of the photography is put in a region between section lines that are defined by two types of golden ratios, a stable composition can be obtained. The imaging device of the present invention assigns weights using the boundary region, and thereby supports to take an image with a suitable composition, eliminating the user requirement of selecting a face region of the main object.

In the above-stated imaging device, the weighting unit may judge, for each of the detected face regions, whether a face region overlaps with the boundary region, and upon judging that the face region overlaps with the boundary region, calculates an evaluation value of the face region judged to overlap with the boundary region, using a weight constant corresponding to the boundary region, and the selection unit selects a face region corresponding to a largest evaluation value among the calculated evaluation values.

In the above-stated imaging device, the weighting unit may calculate the evaluation values by addition of the weight constant.

In the above-stated imaging device, the weighting unit may calculate the evaluation values by multiplication of the weight constant.

In the above-stated imaging device, the weighting unit may judge, for each of the detected face regions, whether a face region overlaps with the boundary region, and upon judging that the face region overlaps with the boundary region, calculate an area of the face region judged to overlap with the boundary region, and calculate an evaluation value of the overlapping face region in accordance with the calculated area of the overlapping face region.

With the above-stated structures, the imaging device selects, as the main object, a face region corresponding to a largest evaluation value among the calculated evaluation values, and thereby supports to take an image with a suitable composition, and accordingly can obtain a stable composition in the photography or the like.

In the above-stated imaging device, the selection unit may judge whether there are a plurality of face regions that correspond to the largest evaluation value, and upon judging that there are not a plurality of face regions, selects one face region corresponding to the largest evaluation value, and when the selection unit judges that there are a plurality of face regions that correspond to the largest evaluation value, namely when there are a plurality of face regions as candidates for the face portion of the main imaging object, the detection unit detects a center point of each of the detected face regions, the weighting unit obtains a new evaluation value for each of detected center points by assigning a weight to a detected center point depending on a level of overlapping of each detected center point with the boundary region, and the selection unit selects a face region corresponding to a largest new evaluation value among all of obtained new evaluation values.

With the above-stated structure, when there are a plurality of face regions that correspond to the largest evaluation value, the imaging device assigns weights using the center points, thus being able to narrow down the face regions as candidates for the main object.

In the above-stated imaging device, the selection unit may judge whether there are a plurality of face regions that correspond to the largest evaluation value, and upon judging that there are not a plurality of face regions, selects one face region corresponding to the largest evaluation value, and when the selection unit judges that there are a plurality of face regions that correspond to the largest evaluation value, namely when there are a plurality of face regions as candidates for the face portion of the main imaging object, the detection unit detects an eye position of each of the detected face regions, the weighting unit obtains a new evaluation value for each of detected eye positions by assigning a weight to a detected eye position depending on a level of overlapping of each detected eye position with the boundary region, and the selection unit selects a face region corresponding to a largest new evaluation value among all of obtained new evaluation values.

With the above-stated structure, when there are a plurality of face regions that correspond to the largest evaluation value, the imaging device assigns weights using the eye positions, thus being able to narrow down the face regions as candidates for the main object.

In the above-stated imaging device, the weighting unit may include: a first obtaining subunit operable to obtain a first weight for each of the detected face regions, by calculating an area of each detected face region and assigning a weight to each detected face region according to the calculated area; a second obtaining subunit operable to judge, for each of the detected face regions, whether a face region overlaps with the boundary region, and upon judging that the face region overlaps with the boundary region, obtain a second weight of the overlapping face region using a weight constant corresponding to the boundary region; and a calculation subunit operable to obtain the evaluation value by using the first weight and the second weight, wherein the selection unit selects a face region corresponding to a largest evaluation value among all of calculated evaluation values.

With the above-stated structure in which the imaging device calculates the evaluation values of each face region from the first weight and the second weight, it is possible to select, as the main object, a face region that is arranged at a stable position in composition of photography, among detected face regions, regardless of whether the face region has the largest size or not.

In the above-stated imaging device, the detection unit may further obtain, for each of the detected face regions, a first value that indicates a level of faceness being a level of looking like a face, the weighting unit judges, for each of the detected face regions, whether a face region overlaps with the boundary region, and upon judging that the face region overlaps with the boundary region, obtains a second value of the overlapping boundary region using a weight constant corresponding to the boundary region, and calculates evaluation values from the first value and the second value, and the selection unit selects a face region corresponding to a largest evaluation value among all of calculated evaluation values.

With the above-stated structure in which the imaging device calculates the evaluation values of each face region from the first weight and the second weight, it is possible to select, as the main object, a face region that overlaps with the boundary region and has the highest level of faceness.

In the above-stated imaging device, the golden ratio may be a ratio between two successive numbers in a Fibbonacci series, one of the two types of golden ratios is a ratio between values 1 and 2, and another one of the two types of golden ratios is a ratio between values 2 and 3, and the boundary region is a region located between a first golden section line determined by a first golden ratio between values 1 and 2 and a second golden section line determined by a second golden ratio between values 2 and 3.

With the above-stated structure in which the imaging device uses a boundary region that is located between the first golden section line determined by a first golden ratio between values 1 and 2 and the second golden section line determined by a second golden ratio between values 2 and 3, it is possible to include all boundary regions that are located between section lines determined by the other ratios from the Fibbonacci series. It is thus possible for the imaging device to assign weights using the broadest boundary region.

In the above-stated imaging device, the storage unit may store four pieces of region information, the weighting unit judges, for each of boundary regions indicated by the four pieces of region information, whether a face region overlaps with any of the boundary regions, and upon judging that the face region overlaps with one or more boundary regions, calculates an evaluation value for the face region using weighting coefficients respectively corresponding to the one or more overlapping boundary regions.

With the above-stated structure in which the imaging device calculates an evaluation value using a weight for each of the boundary regions when the face region overlaps with the boundary region, it is possible to select, as the main object, a face region that overlaps with the largest number of boundary regions.

BRIEF DESCRIPTION OF THE DRAWINGS

These and the other objects, advantages and features of the invention will become apparent from the following description thereof taken in conjuction with the accompanying drawings which illustrate a specific embodiment of the invention. In the drawings:

FIG. 9 shows one example of results of assigning weights to each face region (the evaluation value calculation process);
FIG. 14A shows one example of results of the area calculation process;
FIG. 14B shows one example of results of the weighting coefficient calculation process;
FIG. 14C shows one example of results of the evaluation value calculation process.

Figure 1:
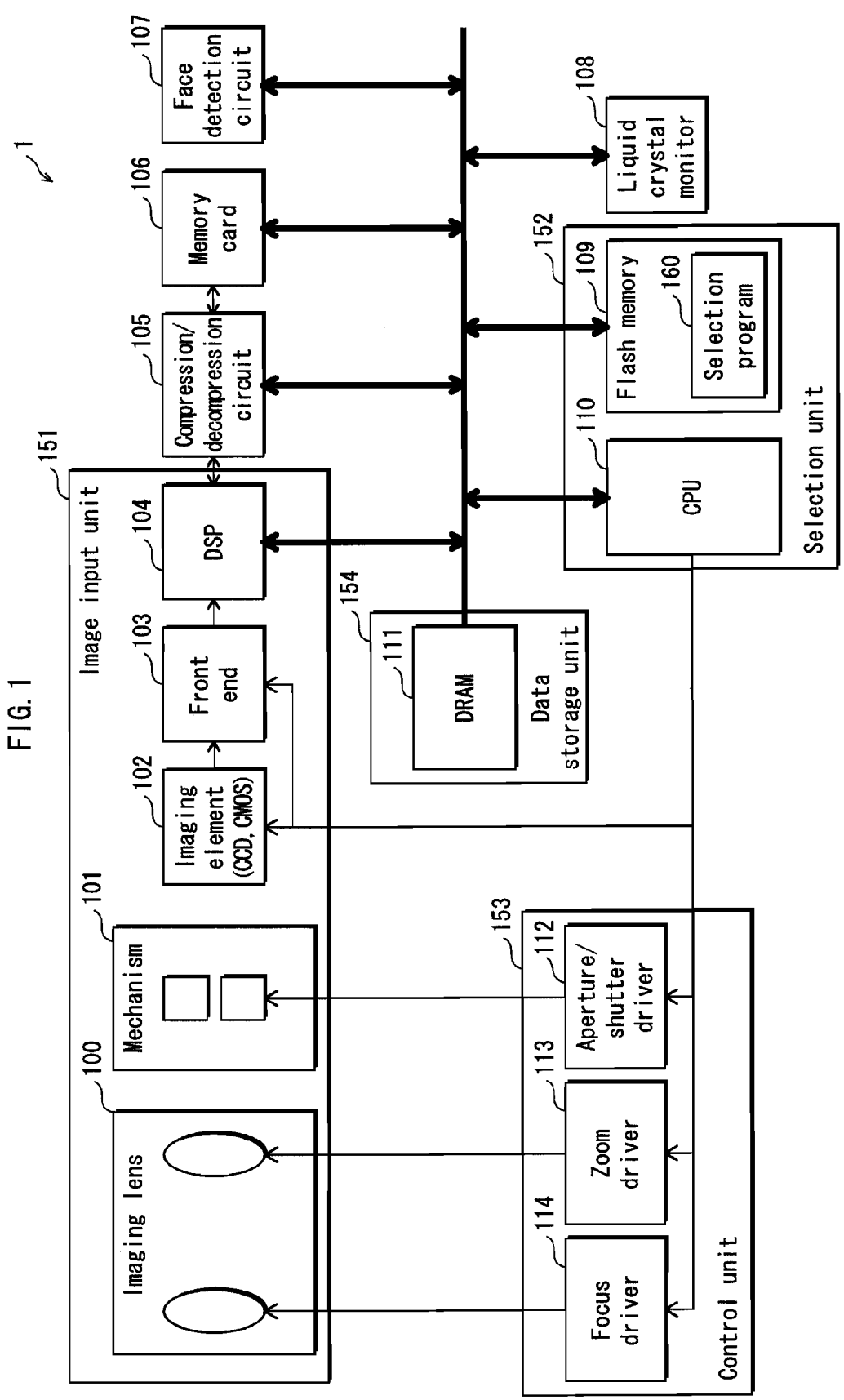
FIG. 1 shows the structure of the imaging device 1.

DESCRIPTION OF CHARACTERS 1 imaging device
100 imaging lens
101 mechanism
102 imaging element
103 front end
104 DSP
105 compression/decompression circuit
106 memory card
107 face detection circuit
108 liquid crystal monitor
109 flash memory
110 CPU
111 DRAM
112 shutter driver
113 zoom driver
114 focus driver
151 image input unit
152 selection unit
153 control unit
154 data storage unit
170 judgment frame storage unit
171 position-based weighting unit
172 result storage unit
173 judging unit

DETAILED DESCRIPTION OF THE INVENTION

1. Embodiment 1

FIG. 1 is a block diagram of an imaging device 1 in Embodiment 1.

The imaging device 1, as shown in FIG. 1, includes an image input unit (imaging mechanism) 151, a selection unit 152, a control unit 153, a data storage unit 154, a compression/decompression circuit 105, a memory card 106, a face detection circuit 107 for detecting faces, a liquid crystal monitor 108 for displaying an interactive screen being interactive with users, and a DRAM (Dynamic Random Access Memory) 111.

The selection unit 152 includes a flash memory 109 and a CPU (Central Processing Unit) 110 for performing various types of controls.

The control unit 153 includes an aperture/shutter driver 112 for controlling an aperture and a shutter, a zoom driver 113 for performing a zoom control, and a focus driver 114 for performing a focus control.

The image input unit 151 includes an imaging lens 100, a mechanism 101, an imaging element 102, a front end 103, and a DSP (Digital Signal Processor) 104.

The imaging lens 100 is used for forming an image. The imaging lens 100 is composed of a zoom lens used for achieving a zoom function, and a focus lens used for focusing an object.

The mechanism 101 includes a mechanical shutter, an aperture for adjusting the brightness of the object, and a filter, and performs the functions of the aperture, the shutter and the like.

The imaging element 102 includes a CCD (Charge Coupled Device) or a CMOS (Complementary Metal Oxide Semiconductor), and generates analog image data by converting an image of the object, which is formed by the imaging lens 100, into an electric signal, and outputs the generated analog image data to the front end 103.

The front end 103 performs a gain adjustment and an A/D (Analogue/Digital) conversion onto the output from the imaging element 102, and outputs digital data of the image data.

The DSP 104 generates the brightness/color difference information or the RGB data by processing the input pixel data.

The compression/decompression circuit 105 is a digital signal processor that can compress and decompress image data generated by the DSP 104.

The memory card 106 preserves compressed images. The DRAM 111 temporarily stores image data and the like.

The following are descriptions of the image input unit 151, selection unit 152, control unit 153, data storage unit 154, and face detection circuit 107.

1.1 Image Input Unit 151

The image input unit 151 generates, from an input image, image data that is to be processed by the face detection circuit 107. The image input unit 151, for example, converts the input image in terms of the resolution and the image data format when the resolution and the image data format of the image received from the imaging element 102 are different from those of the image data to be output to the face detection circuit 107. The image input unit 151 stores, into the data storage unit 154, the image data having been converted for the face detection to be performed by the face detection circuit 107.

It should be noted here that the image to be subjected to the face detection has been imaged with a white balance adjustment based on a predetermined first value (that is preliminarily stored in the memory), an exposure adjustment based on a predetermined second value (that is preliminarily stored in the memory), and a focus adjustment based on a predetermined focal point determined by half pressing the shutter. The first imaging control condition in the present invention includes a focal distance of a lens when the focus is adjusted based on a predetermined focal point, the first value, and the second value.

1.2 Face Detection Circuit 107

The face detection circuit 107 detects what appear to be faces (rectangular regions) from the image data that was stored in the data storage unit 154 by the image input unit 151. Here, having detected what appear to be faces, the face detection circuit 107 generates face position information that is composed of coordinates (x1, y1) of a start point and coordinates (x2, y2) of an end point with respect to each of the detected regions (hereinafter, the regions are referred to as face regions). The face detection circuit 107 stores the generated pieces of face position information in sequence into the data storage unit 154. With this arrangement, the imaging device 1 can identify the rectangular region, namely the face region, by identifying four vertices from the combinations of the coordinates of the start and end points contained in the face position information. For example, it is possible to identify four vertices (x1, y1), (x1, y2), (x2, y1), and (x2, y2) by combining the coordinates (x1, y1) of the start point and the coordinates (x2, y2) of the end point.

It should be noted here that what type of image data is to be used is determined based on the process performed by the face detection circuit 107. For example, only the brightness information may be input, or an image with compressed brightness information may be input. One example of the process performed by the face detection circuit 107 is the conventional one having been described earlier. Description of the algorithm for detecting faces is omitted since it is not the central feature of the present invention. As described above, the face detection circuit 107 outputs rectangle information (coordinates of the start and end points) of what appear to be faces in the image, namely outputs the face position information.

When the face detection circuit 107 have detected a plurality of portions that appear to be faces, the face detection circuit 107 outputs all pieces of rectangle information concerning all of the detected portions. In the present embodiment, the face detection circuit 107 is provided. However, not limited to this, the CPU 110 or the DSP 104 may perform the face detection process in a software manner. In either way, the same effect is expected to be produced.

1.3 Data Storage Unit 154

The data storage unit 154 is composed of the DRAM 111, and has regions for storing the image data generated by the image input unit 151 and a plurality of pieces of face position information generated by the face detection circuit 107.

1.4 Selection Unit 152

The selection unit 152 is, as described earlier, composed of the CPU 110 and the flash memory 109.

The selection unit 152 determines a face region to be set as a region of a main object, from among a plurality of face regions that are respectively indicated by the detected pieces of face position information.

As shown in FIG. 1, the flash memory 109 includes a selection program 160. The selection program 160 assigns a weight to each of a plurality of face regions that are identified by the plurality of pieces of face position information, and based on the results of the weight assignment (from the evaluation values), the selection program 160 determines a face region to be set as a region of a main object. The selection program 160 includes the data used by the selection program itself, as well as the code indicating the operation contents.

The function of the selection unit 152 is achieved as the CPU 110 runs the selection program 160.

Figure 2:
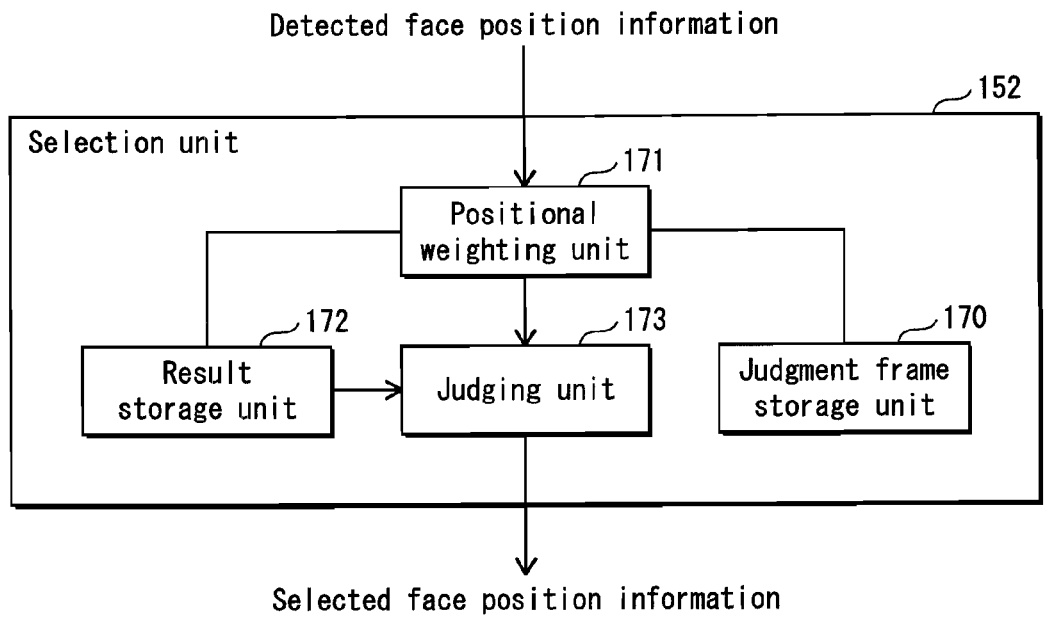
FIG. 2 shows the structure of the selection unit 152.

As shown in FIG. 2, the selection unit 152 includes a judgment frame storage unit 170, a position-based weighting unit 171, a result storage unit 172, and a judging unit 173.

Figure 3:
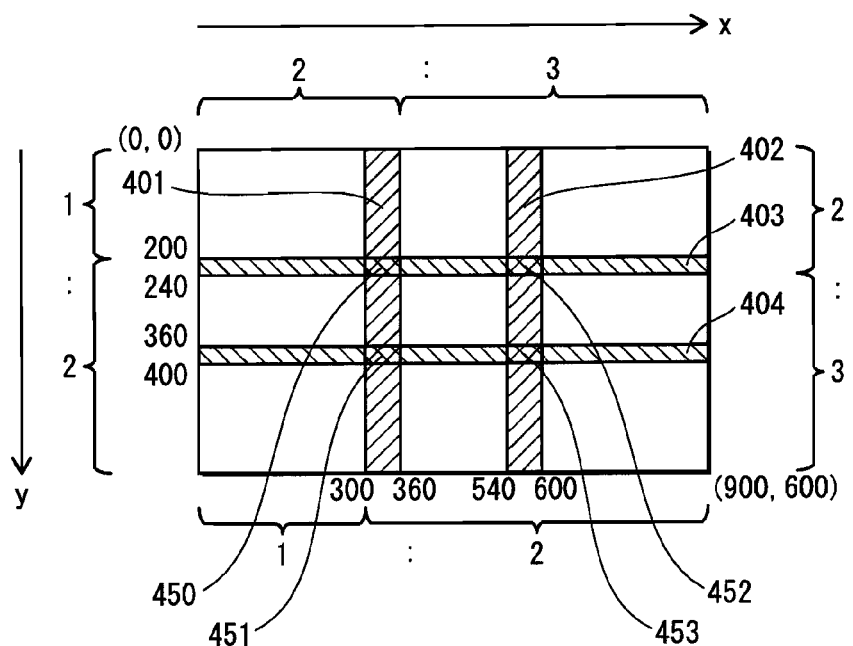
FIG. 3 shows the first through fourth judgment frames 401, 402, 403, and 404 in the case where each photographed image has a size of vertical 600 dots×horizontal 900 dots.

The judgment frame storage unit 170 stores judgment frame information that indicates the first through fourth judgment frames 401, 402, 403, and 404 that are shown in FIG. 3.

In the following description, it is presumed that each photographed image has a size of vertical 600 dots×horizontal 900 dots, as one example.

The first judgment frame 401 is a region that is sandwiched by a line horizontally dividing the screen into a ratio of 1:2, and a line horizontally dividing the screen into a ratio of 2:3. More specifically, the first judgment frame 401 is a rectangular region whose start point is (300, 0) and end point is (360, 600). As is the case with the identification method of the face region using the face position information, the imaging device 1 can identify four vertices of the first judgment frame 401 by combining the coordinates of the start and end points.

Similarly, the second judgment frame 402 is a region that is sandwiched by a line horizontally dividing the screen into a ratio of 2:1, and a line horizontally dividing the screen into a ratio of 3:2. Also, the third judgment frame 403 is a region that is sandwiched by a line vertically dividing the screen into a ratio of 1:2, and a line vertically dividing the screen into a ratio of 2:3. Further, the fourth judgment frame 404 is a region that is sandwiched by a line vertically dividing the screen into a ratio of 2:1, and a line vertically dividing the screen into a ratio of 3:2.

Figures 4, 5:
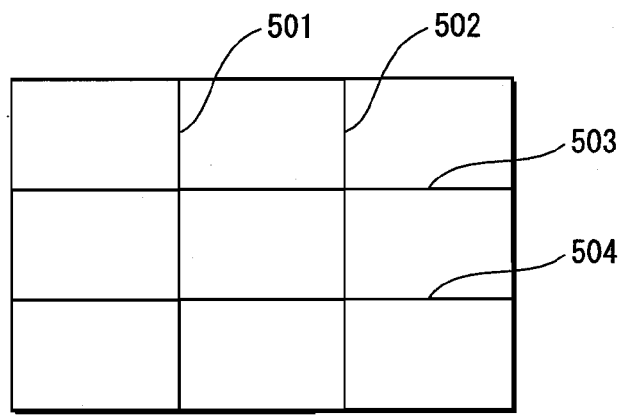
FIG. 4 shows one example of the data structure of the judgment frame table T10 stored in the judgment frame storage unit 170.
FIG. 5 shows the guide lines for frames provided in a camera.

As one specific example, the judgment frame storage unit 170 stores coordinates of the start and end points of each of the first through fourth judgment frames 401 through 404, into a judgment frame table T10 shown in FIG. 4.

The result storage unit 172 has an area for storing evaluation values (represented by "wg") that are the results of assigning weights to a plurality of face regions, in correspondence with pieces of face position information corresponding to the face regions.

Next, the position-based weighting unit 171 will be described.

The position-based weighting unit 171 judges whether a face region has a portion overlapping with any of the first through fourth judgment frames 401, 402, 403 and 404, for each of the face regions respectively corresponding to the plurality of pieces of face position information stored in the data storage unit 154, using the coordinates of the start and end points indicated by the pieces of judgment frame information corresponding to the first through fourth judgment frames 401, 402, 403 and 404, and using the face position information corresponding to the face regions. When it judges that a face region has a portion overlapping with any of the first through fourth judgment frames 401, 402, 403 and 404, the position-based weighting unit 171 calculates an evaluation value by adding a weight constant corresponding to the judgment frame overlapping with the face region. The position-based weighting unit 171 stores the calculated evaluation value into the result storage unit 172 in correspondence with a piece of face position information indicating the face region corresponding to the evaluation value.

The judging unit 173 selects a piece of face position information corresponding to the largest evaluation value among a plurality of pieces of face position information stored in the result storage unit 172 in correspondence with a plurality of evaluation values. The judging unit 173 outputs the selected piece of face position information to the control unit 153.

It should be noted here that the ratio of 1:2 and the ratio of 2:3 used to define the first through fourth judgment frames 401, 402, 403 and 404 are based on what is called golden ratio or golden section. The golden ratio is approximately 1:1.618. The golden ratio is a convergent of the ratio between any two successive numbers in the Fibbonacci series. The Fibbonacci series is a series of numbers such as 1, 2, 3, 5, 8, 13, 21, ... where each new number in the series is derived by adding the two numbers before it. In the present invention, ratios between two successive numbers in the Fibbonacci series are used as the judgment frames by the golden ratio. Other ratios taken from the Fibbonacci series include, for example, 2:3 and 3:5.

The use of the golden ratio in the present invention is based on the fact that, in the fields of photography and drawings, compositions using the golden ratio are widely recommended since a stable composition can be obtained when an object of the photography or drawing is put in a region defined by the golden ratio. For example, some cameras have a function to display guide lines (for example, lines 501, 502, 503, 504 shown in FIG. 5) that divide the screen into equal three parts, vertically and horizontally. When a portrait or the like is taken using the guide lines, the face of the object is apt to overlap with at least one of the guide lines. Making use of the tendency in composition that the main object would overlap with a guide line in such photography, the present invention assigns a weight to a portion of the face that overlaps with such a region so that the person with such an overlapping face tends to be selected as the main object.

The line 501 shown in FIG. 5 corresponds to the line whose start point is (300, 0) and end point is (300, 600), that is contained in the first judgment frame 401 shown in FIG. 3. Similarly, the line 502 corresponds to the line whose start point is (600, 0) and end point is (600, 600), that is contained in the second judgment frame 402; the line 503 corresponds to the line whose start point is (0, 200) and end point is (900, 200), that is contained in the third judgment frame 403; and the line 504 corresponds to the line whose start point is (0, 400) and end point is (900, 400), that is contained in the fourth judgement frame 404.

It should be noted here that, in the present invention, the ratios 1:2 and 2:3 are used as the golden ratio, and that judgment frames that are sandwiched by lines of the ratios other than the ratios 1:2 and 2:3 are all contained in the judgment frames that are sandwiched by lines of the ratios 1:2 and 2:3. In other words, the judgment frames that are sandwiched by lines of the ratios 1:2 and 2:3 are the broadest judgment frames among those based on the golden ratio.

It should be noted here that in the present invention, a golden section line means a line that, for example, divides the screen horizontally into parts between which the ratio is 1:2 or 2:3. Also, boundary regions mean the first through fourth judgment frames. Further, the region information of the present invention corresponds to the judgment frame information in the present embodiment.

1.5 Control Unit 153

The control unit 153, as described earlier, includes the aperture/shutter driver 112, zoom driver 113, and focus driver 114.

Upon receiving a piece of face position information selected by the selection unit 152, the control unit 153 performs processes, such as the focus adjustment, exposure adjustment, and white balance adjustment (hereinafter, the processes are referred to as imaging processes), based on the received piece of face position information, and controls the image input unit 151 to image based on the focus, exposure, white balance and the like after the adjustments.

For example, the control unit 153 performs the pint adjustment based on the selected face region, and controls the image input unit 151 to image based on the adjustment results.

It should be noted here that the focus adjustment, exposure adjustment, and white balance adjustment are known technologies, and description thereof is omitted here.

The second imaging control condition of the present invention includes a focal distance of a lens when the focus is adjusted based on the face region, a value for the exposure adjustment, and a value for the white balance adjustment. The imaging control unit of the present invention is achieved when the CPU 110 and the control unit 153 operate in cooperation.

1.6 Process by Imaging Device 1

In the following, the flow of the imaging process performed by the imaging device 1 in Embodiment 1 will be described. The imaging process is roughly divided into a process for adjusting the focus and exposure, and a process for recording an image onto a memory card. Of these, the process for recording an image onto a memory card will be described first, then the process for adjusting the focus and exposure will be described.

<Image Recording Process>

The light that has passed through the imaging lens 100 is subjected to the photoelectric conversion performed by the imaging element 102, and the data is sent to the front end 103. The front end 103 performs noise reduction, gain adjustment and the like onto the input value, and performs the A/D conversion. It should be noted here that, when the imaging element 102 is the Bayer arrangement of RGGB, the output from the front end 103 is values of each pixel for R, G, G, and B.

The data having been subjected to the A/D conversion is sent to the DSP 104, in which distortions, flaws, and image quality are corrected, and the data is converted from the Bayer arrangement to the pixel data of YcbCr, RGB or the like. The data having been subjected to these processes is temporarily stored into the DRAM 111. The compression/decompression circuit 105 reads out the image data from the DRAM 111, compresses it, and writes the results onto the DRAM 111 or the memory card 106. When the results are written onto the DRAM 111, the compression/decompression circuit 105 transfers the compressed image data from the DRAM 111 to the memory card 106 so that the data is stored therein.

Up to now, the image recording process has been described.

<Focus/Exposure Judgment Process>

The light that has passed through the imaging lens 100 is subjected to the photoelectric conversion performed by the imaging element 102, and the data is sent to the front end 103. The front end 103 performs noise reduction, gain adjustment and the like onto the input value, and performs the A/D conversion. The processes so far are basically the same as those of the image recording process. In the focus/exposure judgment process, however, the size (the number of pixels) of the image output from the front end 103 or the imaging element 102 may be smaller than the image output in the image recording process.

The image input to the DSP 104 is converted into the brightness/color difference image or the RGB image by the DSP 104, and then is stored into the DRAM 111. The image of the Bayer arrangement having been input from the front end 103 in the present process may be temporarily stored in the DRAM 111.

Here, when the AF control by the face recognition is ON, the image data of the Bayer arrangement stored in the DRAM 111, or the brightness/color difference image or the RGB image output from the DSP 104 is input to the face detection circuit 107, and the face detection process is performed by the face detection circuit 107.

When a single face is detected in the face detection process by the face detection circuit 107, the CPU 110 controls the focus driver 114 and the aperture/shutter driver 112 to perform the focus and exposure adjustments onto the detected face. When a plurality of faces are detected, a process is performed to select a face that is to be the main object.

<Selection Process>

Figure 6:
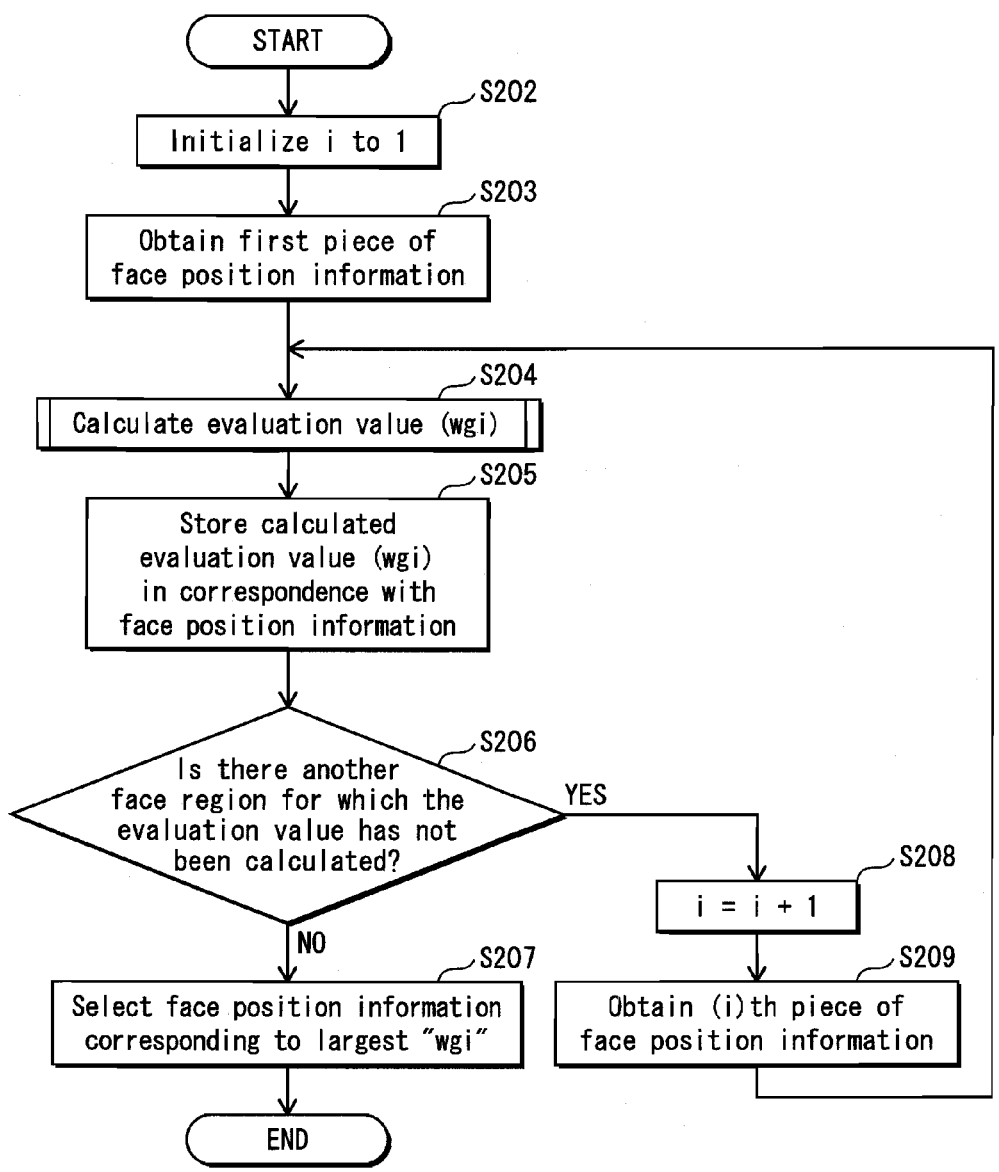
FIG. 6 is a flowchart showing the flow of the selection process.

Described in the following with reference to the flowchart shown in FIG. 6 is the selection process in which a face of the main object is selected.

It is presumed here that the pieces of information regarding the faces are stored in the data storage unit 154 in the order of detection by the face detection circuit 107.

First, the position-based weighting unit 171 of the selection unit 152 initializes the value "i" to "1" (step S202), and obtains a piece of face position information indicating the face region detected first, from the data storage unit 154 (step S203). More specifically, in step S203, the position-based weighting unit 171 sets a pointer to a piece of face position information that was detected first among a plurality of pieces of face position information stored in the data storage unit 154.

Next, the position-based weighting unit 171 calculates the evaluation value "wgi" for the face region indicated by the piece of face position information to which the pointer was set (step S204), and stores the calculated evaluation value into the result storage unit 172 in correspondence with a piece of face position information corresponding to the evaluation value (step S205).

After calculating the evaluation value "wgi" for the face region, the position-based weighting unit 171 judges whether there is another face region for which the evaluation value has not been calculated (step S206). When it judges that there is another face region for which the evaluation value has not been calculated, namely when it judges that there is a piece of face position information that has not been obtained (YES in step S206), the position-based weighting unit 171 updates the value "i" (step S208), obtains a piece of face position information that indicates the $i^{th}$ face region for which the evaluation value has not been calculated (step S209), and returns to step S204. More specifically, in step S209, the position-based weighting unit 171 sets a pointer to the $i^{th}$ piece of face position information.

When it is judged that there is no face region for which the evaluation value has not been calculated, namely when it is judged that all the detected pieces of face position information have been obtained (NO in step S206), the judging unit 173 selects, as information indicating the main object, a piece of face position information that corresponds to the largest evaluation value "wgi" (step S207), and ends the process for determining the region of the main object.

<Weight Calculation Process>

Figure 7:
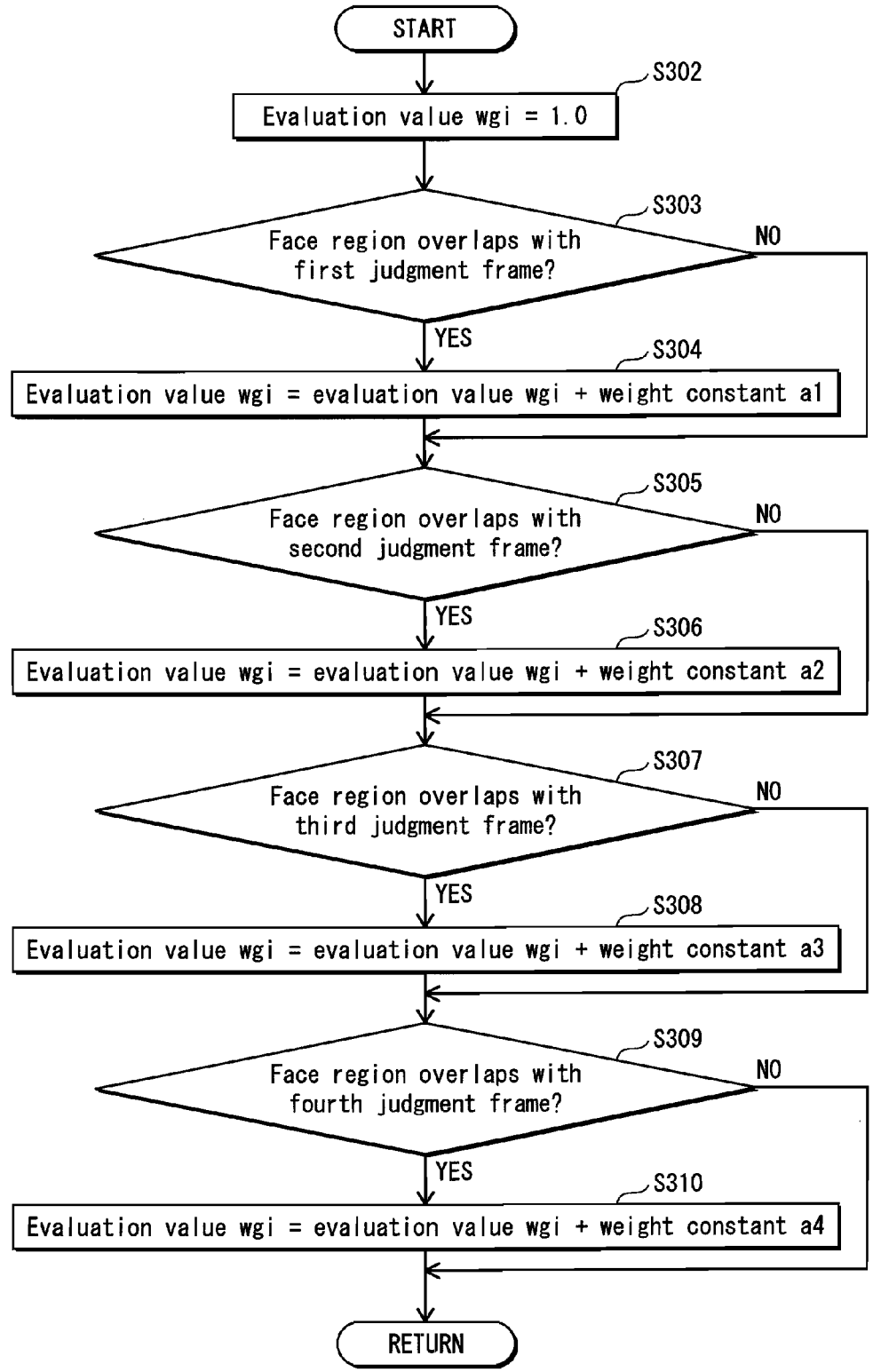
FIG. 7 is a flowchart showing the flow of the evaluation value calculation process.

Described in the following with reference to the flowchart shown in FIG. 7 is the evaluation value calculation process that is performed to calculate the weight "wgi" in step S204 shown in FIG. 6.

First, the position-based weighting unit 171 initializes the evaluation value "wgi" (wgi=1.0) (step S302). Next, the position-based weighting unit 171 judges whether a face region overlaps with the first judgment frame 401 (step S303).

When it judges that the face region overlaps with the first judgment frame 401 (YES in step S303), the position-based weighting unit 171 adds a weight constant a1 to the evaluation value wgi (step S304). After this, the position-based weighting unit 171 whether the face region overlaps with any of the judgment frames 402 through 404, and when it judges that the face region overlaps with any of the judgment frames, the position-based weighting unit 171 adds any of weight constants a2 through a4, which corresponds to the overlapping judgment frame, to the evaluation value wgi (steps S305 through S310).

With the above-described process, each face is weighted as much as the number of judgment frames with which it overlaps. This makes it possible to select, as the main object, an image that overlaps with the largest number of judgment frames.

In the flowchart shown in FIG. 7, the initial value of the evaluation value is "1.0". However, not limited to this, the initial value of the evaluation value may be any value such as "0.0", to obtain the same effect as the present embodiment.

In the present embodiment, the position-based weighting unit 171 adds a weight constant to the evaluation value wgi when it judges that a face region overlaps with a judgment frame. However, not limited to this, the position-based weighting unit 171 may multiply the evaluation value wgi by a weight constant when it judges that a face region overlaps with a judgment frame. In this case, the weight constant needs to be a value greater than "1".

Further, in the present embodiment, four judgment frames are used. However, the number of judgment frames is not limited to four, but may be any number of 1 or more. For example, only the third judgment frame 403 in horizontal direction may be used in the judgment on whether a face region overlaps with a judgment frame. It is expected that this modification provides substantially the same effect as the present embodiment. Especially, when a horizontally long picture is taken, it often happens that the face of the main object is arranged on a horizontal line that divides the screen into two parts where the upper part is one thirds of the screen. Accordingly, when only the third judgment frame is used in the judgment, a sufficient effect is expected to be produced.

1.7 Specific Example of Operation

Figure 8:
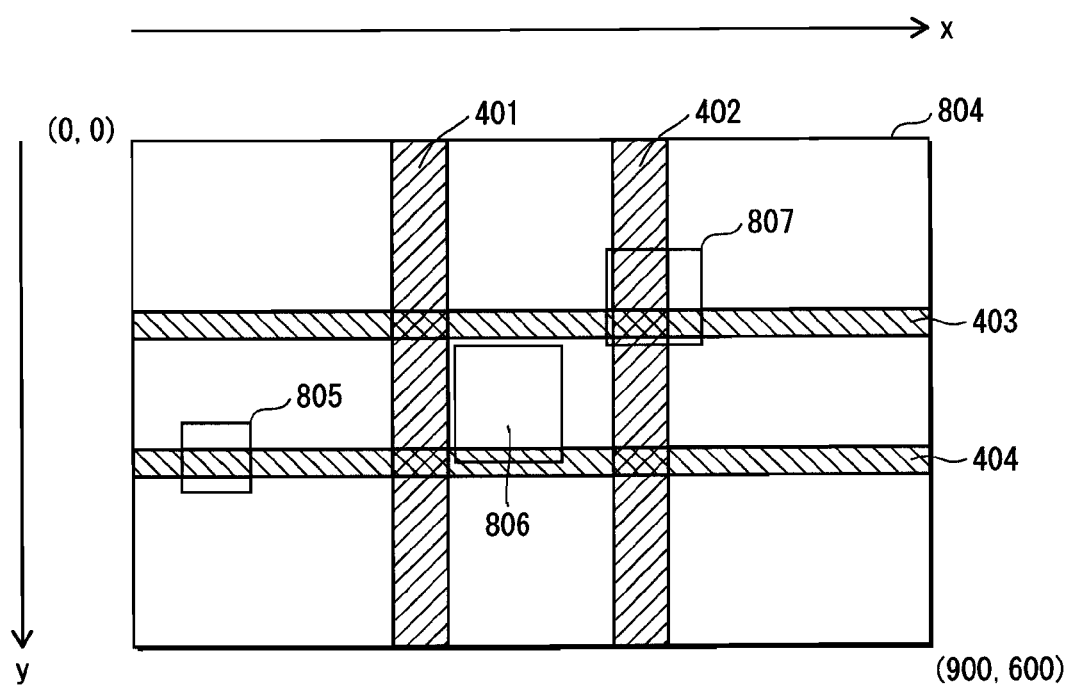
FIG. 8 shows one example of detected face regions.

Here, the above-described processes will be described more specifically, with reference to FIGS. 8 and 9. FIG. 8 shows that a first face region 805, a second face region 806, and a third face region 807 are detected from a photo image 804.

FIG. 9 shows results of assigning weights to each face region. The result storage unit 172 stores evaluation values of each face region, for example, using a table T100 shown in FIG. 9.

It is presumed in the present example that the initial value of the evaluation values is 1.0 and weight constants are each 0.2.

The position-based weighting unit 171 judges whether each face region overlaps with any of the first through fourth judgment frames 401, 402, 403 and 404 shown in FIG. 8, adds the weight of 0.2 each time it is judged that the face region overlaps with one judgment frame. For example, the third face region 807 overlaps with two judgment frames. As a result, +0.4 is added, and the evaluation value of the third face region 807 becomes 1.4.

The judging unit 173 selects a piece of face position information that corresponds to the largest evaluation value (in this example, "1.4"), from the table T100 stored in the result storage unit 172.

1.8 Summary of Embodiment 1

As described above, according to the present embodiment, when a plurality of faces are detected, it is possible to select the main object from among the faces in accordance with the intention of the photographer, by using the composition information that is based on the golden ratio, and then the focus/exposure adjustment process is performed.

2. Embodiment 2

Figure 10:
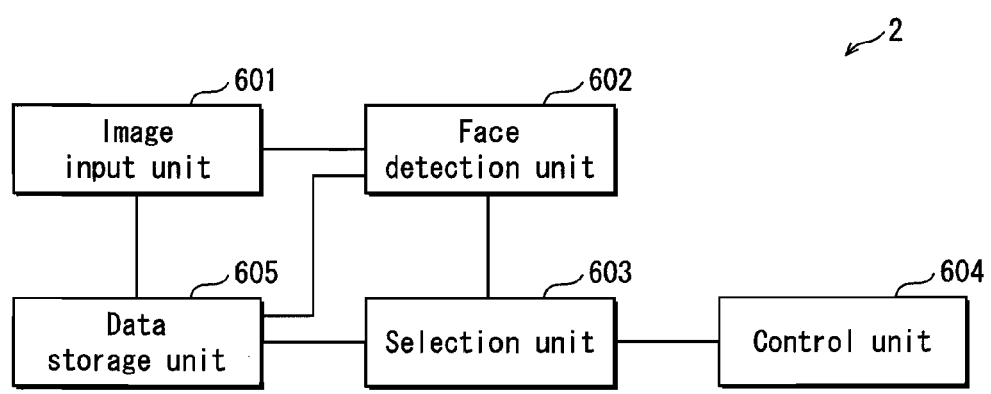
FIG. 10 shows the structure of the imaging device 2.

FIG. 10 is a block diagram of an imaging device 2 in Embodiment 2.

The imaging device 2, as shown in FIG. 10, includes an image input unit 601, a face detection unit 602, a selection unit 603, a control unit 604, and a data storage unit 605.

Of these, description of the image input unit 601, face detection unit 602, control unit 604, and data storage unit 605 is omitted since they are the same as the image input unit 151, face detection circuit 107, control unit 153, and data storage unit 154 described in Embodiment 1.

In the following, the selection unit 603 will be described.

2.1 Selection Unit 603

The selection unit 603 determines a face region to be set as a region of a main object, from among a plurality of face regions detected by the face detection unit 602.

Figure 11:
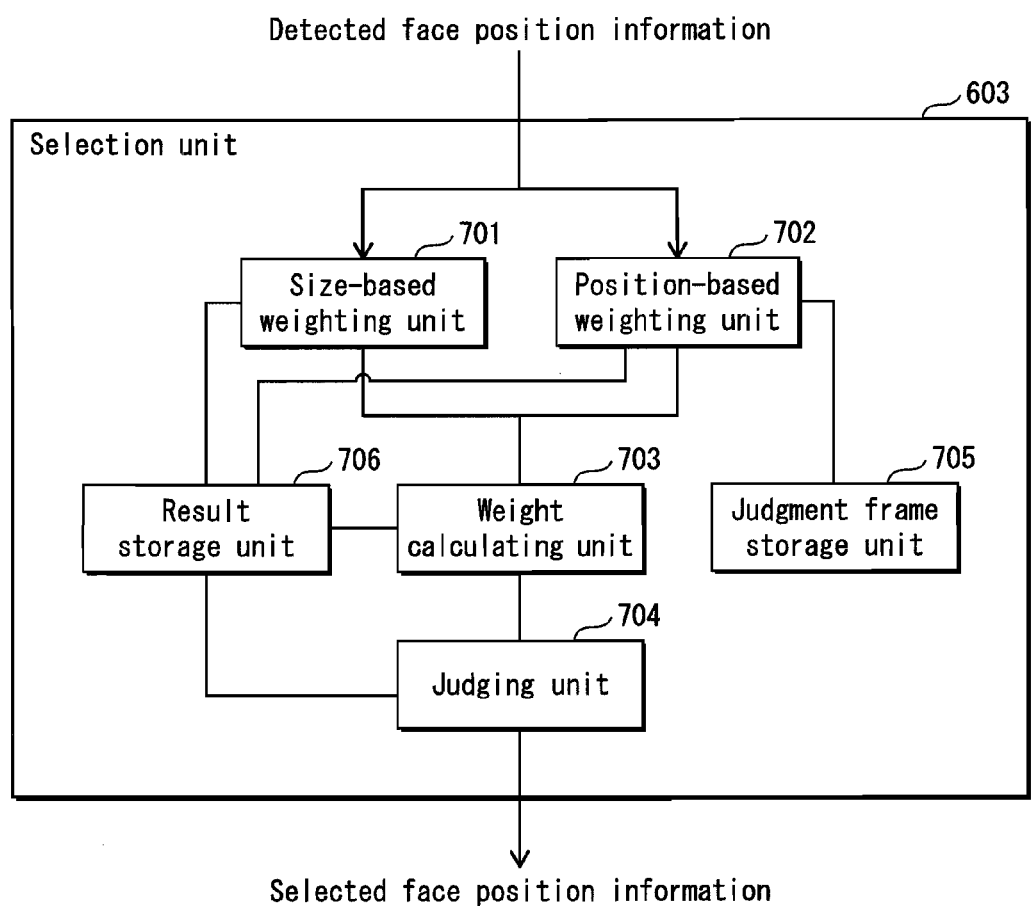
FIG. 11 shows the structure of the selection unit 603.

As shown in FIG. 11, the selection unit 603 includes a size-based weighting unit 701, a position-based weighting unit 702, a weight calculating unit 703, a judging unit 704, a judgment frame storage unit 705, and a result storage unit 706.

<Judgment Frame Storage Unit 705>

The judgment frame storage unit 705, as is the case with the judgment frame storage unit 170 of Embodiment 1, stores judgment frame information for each of the first through fourth judgment frames 401, 402, 403, and 404, as shown in FIG. 3.

<Result Storage Unit 706>

The result storage unit 706 has an area for storing evaluation values that are the results of assigning weights to a plurality of face regions, in correspondence with (i) pieces of face position information corresponding to the face regions, (ii) areas of the face regions, and (iii) weighting coefficients. The weighting coefficients will be described later.

<Size-based Weighting Unit 701>

The size-based weighting unit 701 assigns a weight to each of a plurality of face regions that are identified by the plurality of pieces of face position information, by calculating the area of each face region. In the size-based weighting, for example, the calculated area of the face region, itself, may be set as the weight, or unique values may be assigned, as weights, to the face regions, where the values as the weights may be determined such that the larger the area of the face region is, the greater the assigned weight is. In the present embodiment, the calculated area of the face region, itself, is set as the weight.

The size-based weighting unit 701 stores the calculated weights (in the present example, the areas of the face regions) into the result storage unit 706 in correspondence with pieces of face position information indicating the face regions to which the weights are assigned.

<Position-based Weighting Unit 702>

The position-based weighting unit 702, as is the case with Embodiment 1, assigns weights depending on whether the detected face regions overlap with any of the regions, using the judgment frame information stored in the judgment frame storage unit 705 and the face position information indicating the face regions. Here, the values obtained as a result of assigning weights are referred to as weighting coefficients.

The position-based weighting unit 702 stores the calculated weighting coefficients into the result storage unit 706 in correspondence with pieces of face position information indicating the face regions to which the weights are assigned.

As the weighting method, as is the case in Embodiment 1, a weight constant may be added to a target face region as many times as the number of judgment frames with which the target face region overlaps as shown in FIG. 3, or a weight, which differs depending on the area of the portion of the target face region that overlaps with the judgment frames shown in FIG. 3, may be assigned to the target face region. Either of the weighting methods is expected to produce the same effect. Used in the present embodiment is, as is the case in Embodiment 1, the weighting method where a weight constant is added to a target face region as many times as the number of judgment frames with which the target face region overlaps.

It should be noted here that the regions of the judgment frames shown in FIG. 3 are one example, and the same effect is expected to be produced when the regions are selected as the judgment frames based on the golden ratio of 1:1.618.

<Weight Calculating Unit 703>

The weight calculating unit 703 calculates an evaluation value (wi) for each of the detected face regions, using the weighting results output from the size-based weighting unit 701 and the position-based weighting unit 702. The weight calculating unit 703 stores the calculated evaluation values (wi) into the result storage unit 706 in correspondence with pieces of face position information indicating the face regions corresponding to the evaluation values.

There are various methods for calculating the evaluation value, such as a simple addition or multiplication of the two types of weights, and an addition/multiplication in combination with a constant multiplication. Such evaluation value calculation methods provide differences. For example, either the size or position may be emphasized depending on the selected evaluation value calculation method.

For example, weight wi to be assigned to the $i^{th}$ face region is calculated based on either Equation 1 or Equation 2 shown below, where wsi represents a size-based weight for the $i^{th}$ face region, wpi represents a position-based weight (weighting coefficient) for the $i^{th}$ face region, and "a" and "b" respectively represent a constant:

$$wi = a \times wsi + b \times wpi \qquad \text{(Equation 1)}$$

$$wi = a \times wsi \times b \times wpi \qquad \text{(Equation 2)}$$

In the present embodiment, Equation 2 is used for calculating the weights.

<Judging Unit 704>

The judging unit 704 selects, as information indicating the main object, a piece of face position information corresponding to the largest evaluation value (max(wi)) among the calculated evaluation values (wi).

2.2 Operation of Imaging Device 2

The following will describe the operation of the imaging device 2.

As is the case with Embodiment 1, the operation of the imaging device 2 is roughly divided into the image recording process and the focus/exposure judgment process.

Description of the image recording process is omitted here since it is the same as the image recording process in Embodiment 1.

The focus/exposure judgment process of Embodiment 2 is different from that in Embodiment 1 in the process for selecting, as the main object, a face from among a plurality of detected faces.

<Selection Process>

The selection process of Embodiment 2 will be described in the following with reference to the flowchart shown in FIG. 12.

It is presumed here that the pieces of information regarding the faces are stored in the data storage unit 605 in the order of detection by the face detection unit 602.

The size-based weighting unit 701 of the selection unit 603 performs an area calculation process to calculate the area (ws) of each of a plurality of detected face regions, in the order of detection, and stores the calculated areas of the detected face regions in sequence into the result storage unit 706 in correspondence with pieces of face position information indicating the face regions (step S401).

The position-based weighting unit 702, in the weighting coefficient calculation process, calculates the weighting coefficient (wp) for each of the plurality of detected face regions, in the order of detection, and stores the calculated weighting coefficients in sequence into the result storage unit 706 in correspondence with pieces of face position information indicating the face regions (step S402).

The weight calculating unit 703 of the selection unit 603 initializes the value "i" to "1" (step S403), and obtains a piece of face position information indicating the face region detected first (step S404). More specifically, in step S404, the weight calculating unit 703 sets a pointer to a piece of face position information that is the first in position, among a plurality of pieces of face position information stored in the result storage unit 706.

Next, the weight calculating unit 703 calculates the evaluation value "wi" for the face region indicated by the piece of face position information to which the pointer was set (step S405), and stores the calculated evaluation value wi into the result storage unit 706 in correspondence with a piece of face position information corresponding to the evaluation value wi (step S406).

After calculating the evaluation value wi for the face region, the weight calculating unit 703 judges whether there is another face region for which the evaluation value has not been calculated (step S407). When it judges that there is another face region for which the evaluation value has not been calculated, namely when it judges that there is a piece of face position information that has not been obtained (YES in step S407), the weight calculating unit 703 updates the value "i" (step S409), obtains a piece of face position information that indicates the $i_{th}$ face region for which the evaluation value has not been calculated (step S410), and returns to step S405.

More specifically, in step S410, the weight calculating unit 703 sets a pointer to the $i^{th}$ piece of face position information stored in the result storage unit 706.

When it is judged that there is no face region for which the evaluation value has not been calculated, namely when it is judged that all the detected pieces of face position information have been obtained (NO in step S407), the judging unit 704 selects, as information indicating the main object, a piece of face position information that corresponds to the largest evaluation value "wi" (step S408), and ends the process for determining the main object.

In the present embodiment, the area calculation process is performed before the weighting coefficient calculation process. However, not limited to this, for example, the area calculation process may be performed after the weighting coefficient calculation process, or the two processes may be performed in parallel.

Also, the area of face region, the weighting coefficient, and the evaluation value are calculated respectively in separate processes. However, not limited to this, the following procedures are possible, for example: the selection process shown in FIG. 12 is started with the step S403, omitting the steps S401 and S402; then in the step S405, the area of face region, the weighting coefficient, and the evaluation value are calculated; and in the step S406, each of the calculated values is stored in the result storage unit 706 in correspondence with a piece of face position information.

That is to say, the requirement for the calculation is that, when an evaluation value (wi) for a face region is calculated, the area and the weighting coefficient for the face region have already been calculated.

<Area Calculation Process>

Figure 12:
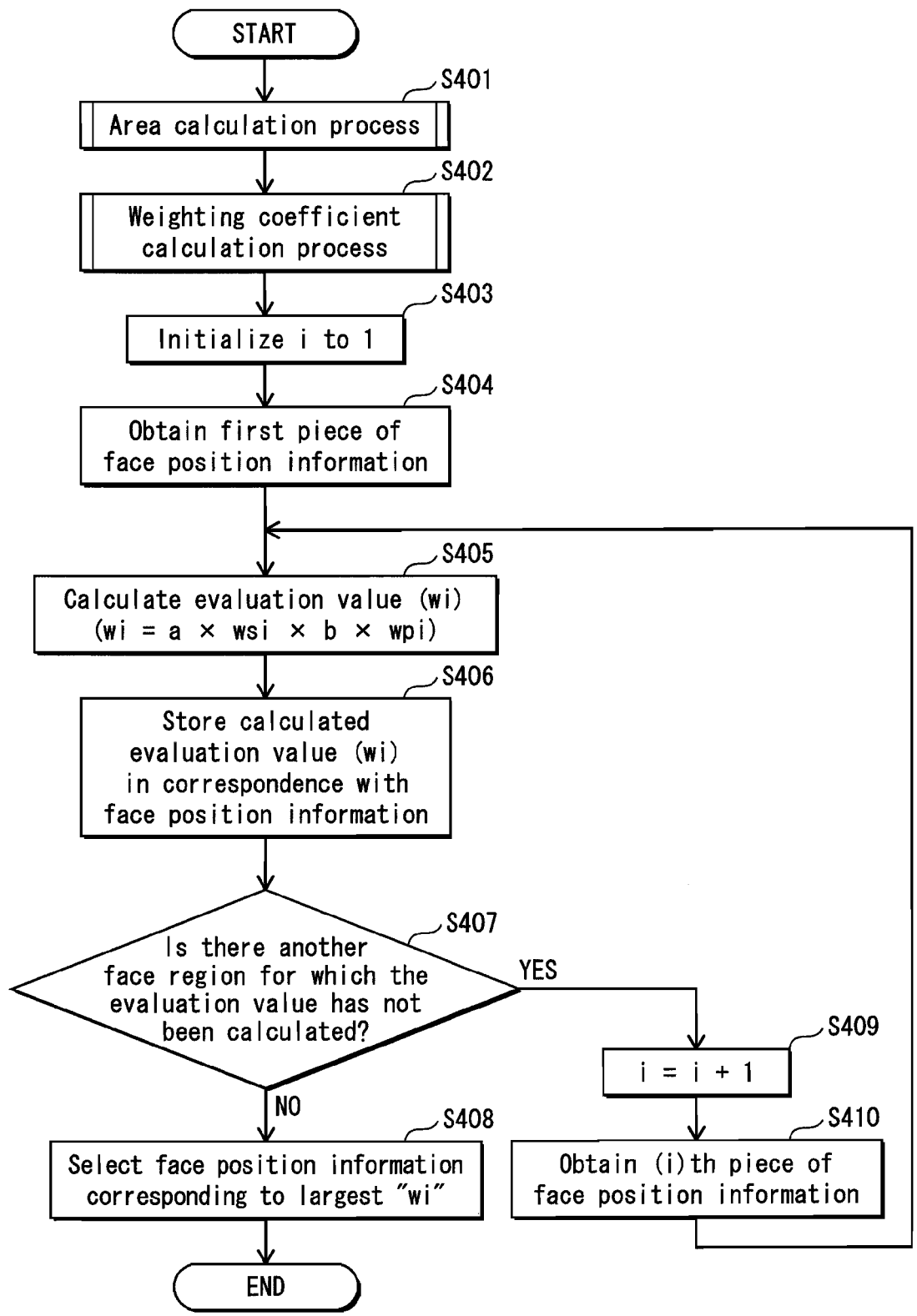
FIG. 12 is a flowchart showing the flow of the selection process.
Figure 13:
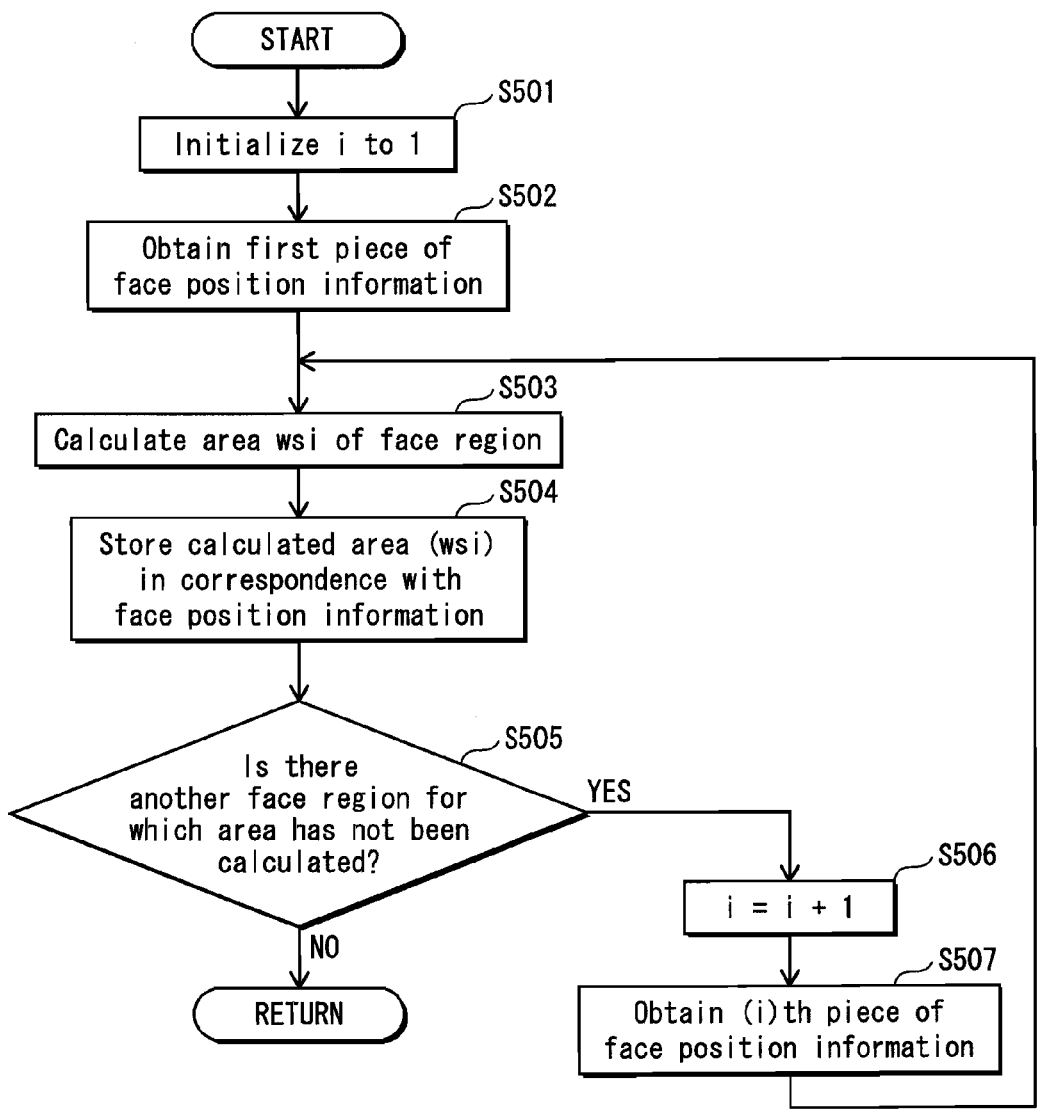
FIG. 13 is a flowchart showing the flow of the area calculation process.

Described in the following with reference to the flowchart of FIG. 13 is the area calculation process that is performed in step S401 shown in FIG. 12.

First, the size-based weighting unit 701 initializes the value "i" to "1" (step S501), and obtains a piece of face position information indicating the face region detected first, from the data storage unit 605 (step S502). More specifically, in step S502, the size-based weighting unit 701 sets a pointer to the first piece of face position information stored in the data storage unit 605, namely a piece of face position information that was detected first among a plurality of pieces of face position information stored therein.

Next, the size-based weighting unit 701 calculates the area (ws) of the face region indicated by the piece of face position information to which the pointer was set (step S503), and stores the calculated area of the face region into the result storage unit 706 in correspondence with a piece of face position information corresponding to the face region (step S504).

After calculating the area of the face region, the size-based weighting unit 701 judges whether there is another face region of which the area has not been calculated (step S505). When it judges that there is another face region of which the area has not been calculated, namely when it judges that there is a piece of face position information that has not been obtained (YES in step S505), the size-based weighting unit 701 updates the value "i" (step S506), obtains a piece of face position information that indicates the $i^{th}$ face region of which the area has not been calculated (step S507), and returns to step S503. More specifically, in step S507, the size-based weighting unit 701 sets a pointer to the $i^{th}$ piece of face position information.

When it is judged that there is no face region of which the area has not been calculated, namely when it is judged that all the detected pieces of face position information have been obtained (NO in step S505), the operation moves to step S402.

<Weighting Coefficient Calculation Process>

Description of the weighting coefficient calculation process that is performed in step S402 shown in FIG. 12 is omitted since it is performed in the same manner as steps S202 through S206 shown in FIG. 6.

It should be noted here that, when it is judged as "NO" in step S206, the operation moves to step S403.

It should also be noted here that the evaluation value wgi calculated in steps S202 through S206 shown in FIG. 6 corresponds to the weighting coefficient wpi calculated in the weighting coefficient calculation process.

It should further be noted here that pieces of face position information used in the calculation of weighting coefficients is obtained in sequence from the result storage unit 706.

2.3 Specific Example of Operation

Here, the above-described processes will be described more specifically, with reference to the photo image 804 shown in FIG. 8.

It is presumed in the present example that the constants "a" and "b" used in calculating the evaluation value wi are each 1.0, the initial value used in calculating the weighting coefficient is 1.0, and weight constants a1 through a4 are each 0.2.

In the area calculation process, areas (wsi) of three face regions (the first face region 805, second face region 806, and third face region 807), which have been detected from the photo image 804, are calculated, and the calculated areas of the detected face regions are stored into the result storage unit 706 in correspondence with pieces of face position information. FIG. 14A shows the results of calculating the area of each face region. The result storage unit 706 stores the areas of the face regions, for example, using a table T101 shown in FIG. 14A.

In the weighting coefficient calculation process, weighting coefficients (wpi) of the three face regions (the first face region 805, second face region 806, and third face region 807) are calculated, and the calculated weighting coefficients are stored into the result storage unit 706 in correspondence with pieces of face position information. FIG. 14B shows the results of calculating the weighting coefficient of each face region. The result storage unit 706 stores the areas and weighting coefficients of the face regions, for example, using a table T102 shown in FIG. 14B.

After this, the weight calculating unit 703 calculates evaluation values (wi) for the face regions, and stores the calculated evaluation values into the result storage unit 706 in correspondence with pieces of face position information. FIG. 14C shows the results of calculating the evaluation value of each face region. The results storage unit 706 stores the areas, weighting coefficients, and evaluation values of the face regions, for example, using a table T103 shown in FIG. 14C.

Here, when the selection is made based on the area of face region, the second face region 806 is selected from the table T101.

On the other hand, when the selection is made based on the evaluation value, which is the result of multiplying the area of face region by the weighting coefficient and is shown in the table T103, the third face region 807 is selected because it has the largest evaluation value.

When the photographer arranges the main object in the region set by the golden ratio, the selection based on FIG. 14C is more preferable than the selection based on FIG. 14A. As described in Embodiment 1, in the composition conscious photography, it is highly possible that the main object is the person with the face in the third face region 807, not the one with the face in the second face region 806 that is arranged almost at the center of the photo image. Accordingly, the selection of the third face region 807 is closer to the intention of the photographer.

2.4 Summary of Embodiment 2

As described above, the present embodiment selects the main object by calculating weights assigned to the objects in a photo image depending on whether they are in the regions set based on the golden ratio. With this structure, it is possible to increase the possibility that the main object intended by the photographer is focused and subjected to the exposure.

In the present embodiment, the evaluation values are calculated using the areas of face regions and the composition (the levels of overlapping with the judgment frames). However, the effect of the present embodiment would be produced in the same manner, for example, when the level of "faceness" (level of looking like a face) is used as well in calculating the evaluation value. Further, it is possible to change the values "a" and "b" to set which of the face size and the composition should be prioritized in the selection.

3. Embodiment 3

In Embodiment 1, the face detection circuit 107 detects a plurality of face regions, the selection unit 152 assigns weights to each face region, and one face region is selected based on the results of weighting.

However, there may be the case where two or more face regions are assigned the same evaluation value, and one face region cannot be selected.

In view of this, Embodiment 3 of the present invention performs an additional weighting using a center point and eye position, which are detected in each face region detected as described in Embodiments 1 and 2, as shown in FIG. 15, so as to further narrow down the candidates for the main object.

Figure 15A:
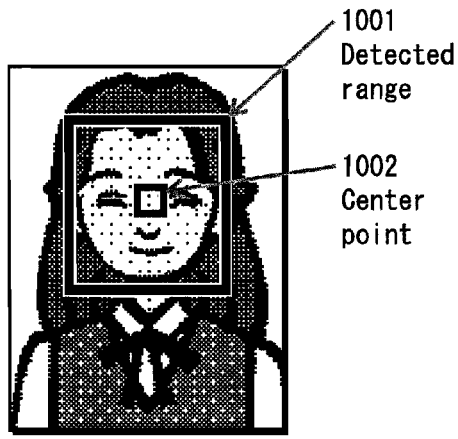
FIG. 15A shows one example of the center point of a detected face region.
Figure 15B:
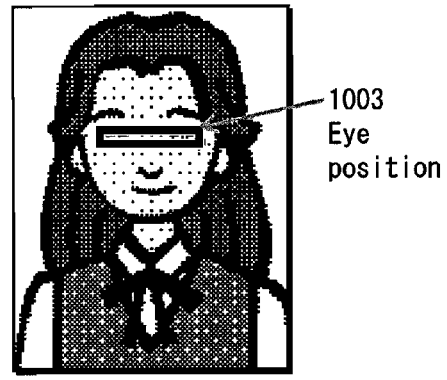
FIG. 15B shows one example of the eye position.

In FIG. 15A, sign "1001" represents a detected range (face region), and sign "1002" represents a center point of the detected range. In FIG. 15B, sign "1003" represents an eye position in the detected range. The center point is the center of the detected range, or a point between the eyebrows (between the eyes).

In the following, the present embodiment will be described using the structural elements of Embodiment 1.

In the following description, the center point is used.

When it is found, by checking the evaluation values of the detected face regions, that there are a plurality of face regions as candidates for the main object, the face detection circuit 107 detects the center point of each of the candidate face regions, and stores the coordinates of the start and end points of each of the detected center points into the data storage unit 154 in correspondence with the face position information indicating the face regions. Description of the method for detecting the center point is omitted here since it is well known.

The selection unit 152 performs position-based weighting (calculation of evaluation values) for each of the candidate face regions, using the center point and judgment frame thereof. Obtains a center point corresponding to the largest evaluation value from the data storage unit 154, and selects a piece of face position information corresponding to the obtained center point from the data storage unit 154.

Here will be explained one example of the operation.

The imaging device 1 obtains all pieces of face position information corresponding to the largest weight, in the selection process, in step S207 shown in FIG. 6.

It is then judged whether two or more pieces of face position information have been obtained. When it is judged positively, the face detection circuit 107 detects the center point for each of the two or more obtained pieces of face position information. The selection unit 152 calculates an evaluation value for each of the detected center points by operating in the same manner as in calculating the evaluation value for each of the detected face regions, and selects a center point having the largest evaluation value. The selection unit 152 further obtains a piece of face position information corresponding to the selected center point.

Up to now, the operation of the present embodiment has been described, in which only the center point is used. However, not limited to this, only the eye position may be used, or both the center point and the eye position may be used. It should be noted here that description of the method for detecting the eye position is also omitted here since it is well known.

Figure 16A:
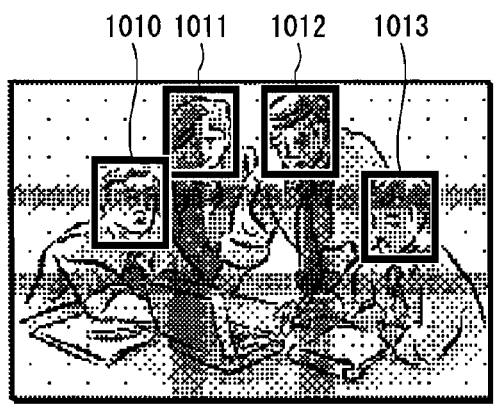
FIG. 16A shows one example of results of detecting faces.
Figure 16B:
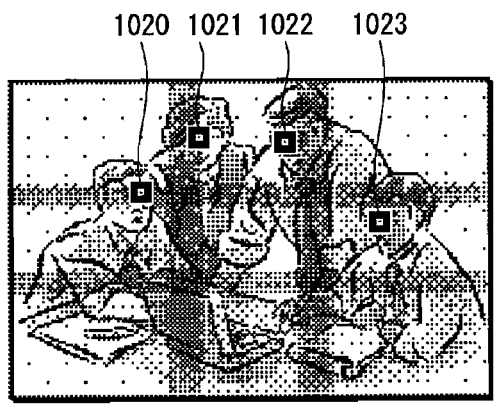
FIG. 16B shows one example of results of detecting center points.

With such a structure of the present embodiment, when all of the detected four face regions 1010, 1011, 1012, and 1013 overlap with the judgment frames as shown in FIG. 16A, it is possible to reduce the number of candidates for the main object by using the center points 1020, 1021, 1022, and 1023 of these face regions. That is to say, among the four face regions, there are two face regions whose center points overlap with the judgment frames as shown in FIG. 16B, and these can be selected as the candidates. Accordingly, the candidates for the main object are narrowed down from four to two by the judgment using the center points.

Figure 17:
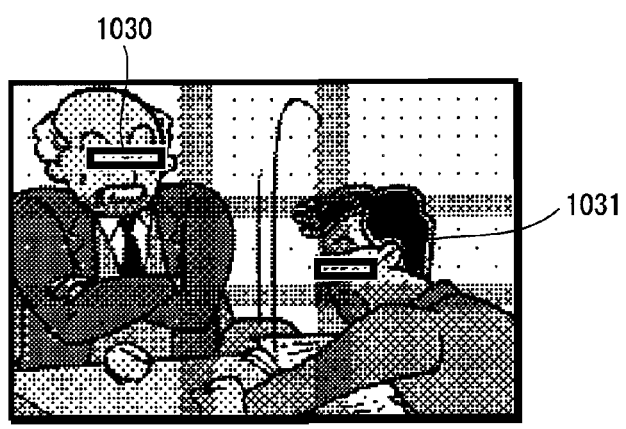
FIG. 17 shows one example of results of detecting eye positions.

Also, in the case as shown in FIG. 17 where two faces overlap with the judgment frames, the number of candidates is reduced from two to one by performing the judgment using only the eye positions 1030 and 1031 of the face regions, since only one eye position among these eye positions overlaps with the judgment frames.

It should be noted here that the center point and the eye position are important for composition. It is natural in composition to arrange the center point or eye position in a region defined by the golden ratio. Therefore, it is possible to assign weights to faces more accurately depending on the importance of the faces by performing the judgment using the center point and/or the eye position.

As described above, according to Embodiment 3 of the present invention, it is possible to improve the accurateness of the detection of the main object, even in the case where a plurality of face regions overlap with the judgment frames due to the largeness of the face regions.

The present embodiment has been described using the imaging device 1 in Embodiment 1. However, the weighting using the center point and/or the eye position as described in the present embodiment produces the same advantageous effects even if it is applied to Embodiment 2.

In the present embodiment, when a plurality of face regions have been detected as candidates for the main object, the center points and/or the eye positions of the face regions are detected. However, not limited to this, the face detection unit may detect the center points and/or the eye positions of face regions at the same time it detects the face regions, and may preliminarily store the detected center points and/or eye positions into the data storage unit in correspondence with the detected face regions.

4. Embodiment 4

Here will be described a monitoring system 1000 in Embodiment 4.

Figure 18:
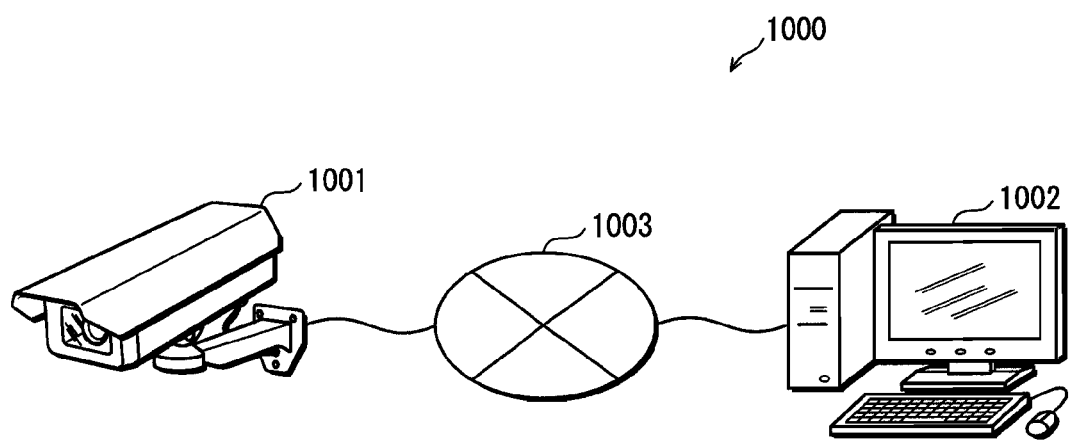
FIG. 18 shows an outline of the monitoring system 1000.
Figure 19:
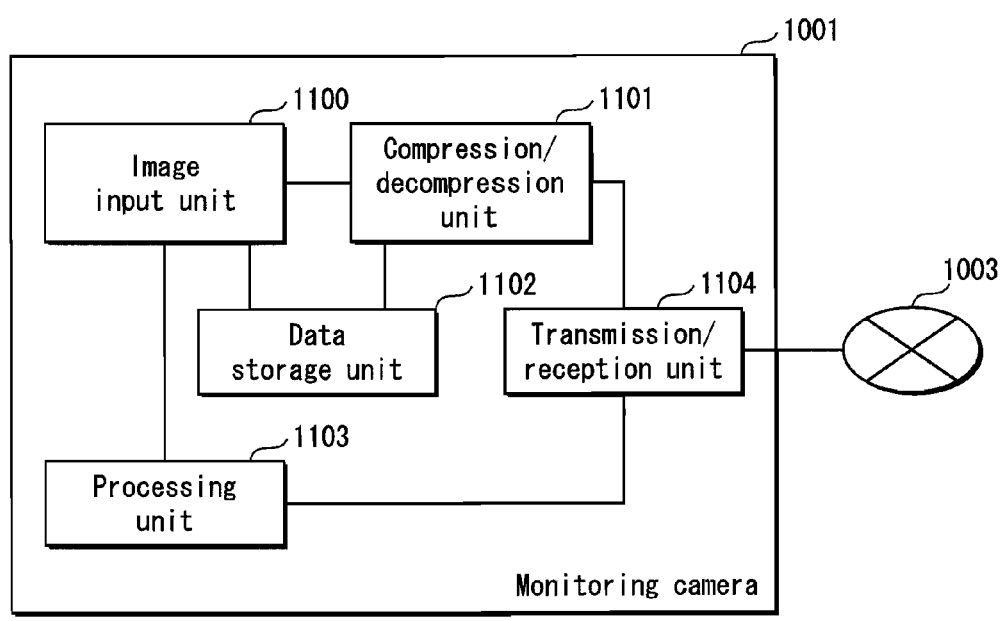
FIG. 19 shows the structure of the monitoring camera 1001.

As shown in FIG. 18, the monitoring system 1000 includes a monitoring camera 1001 and an image processing device 1002, where the monitoring camera 1001 and the image processing device 1002 are connected with each other via a network 1003.

4.1 Monitoring Camera 1001

As shown in FIG. 18, the monitoring camera 1001 includes an image input unit 1100, a compression/decompression unit 1101, a data storage unit 1102, a processing unit 1103, and a transmission/reception unit 1104.

Description of the image input unit 1100 is omitted here since it is the same as the image input unit 151 of Embodiment 1.

The data storage unit 1102 has a region for storing the image data generated by the image input unit 1100.

The compression/decompression unit 1101 generates compressed data by subjecting the image data stored in the data storage unit 1102 into a compression process, and transmits the generated compressed data to the image processing device 1002 via the transmission/reception unit 1104.

Upon receiving a piece of face position information and an instruction for performing imaging processes such as the focus adjustment, exposure adjustment, and white balance adjustment, from the image processing device 1002 via the transmission/reception unit 1104, the processing unit 1103 performs the instructed processes based on the received piece of face position information.

For example, upon receiving a piece of face position information and a focus instruction from the image processing device 1002, the processing unit 1103 performs a focus process onto a face region indicated by the received piece of face position information.

The transmission/reception unit 1104 transmits the compressed data received from the compression/decompression unit 1101, to the image processing device 1002 via the network 1003.

The transmission/reception unit 1104 transmits a piece of face position information and an instruction for performing imaging processes, which are received from the image processing device 1002 via the network 1003, to the processing unit 1103.

4.2 Image Processing Device 1002

Figure 20:
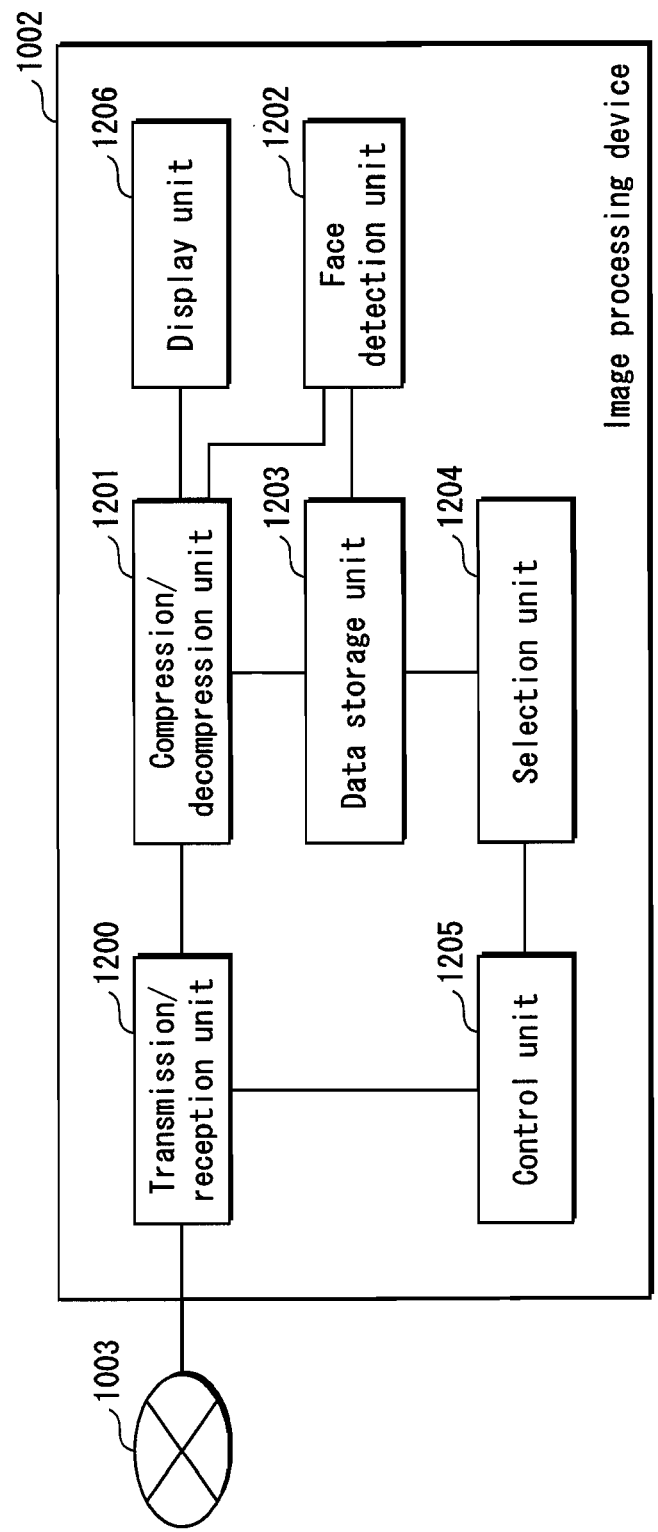
FIG. 20 shows the structure of the image processing device 1002.

The image processing device 1002, as shown in FIG. 20, includes a transmission/reception unit 1200, a compression/decompression unit 1201, a face detection unit 1202, a data storage unit 1203, a selection unit 1204, a control unit 1205, and a display unit 1206.

Description of the face detection unit 1202, selection unit 1204, and display unit 1206 is omitted here since they are the same as the face detection circuit 107, selection unit 152, and liquid crystal monitor 108 in Embodiment 1.

Upon receiving the compressed data from the monitoring camera 1001 via the network 1003, the compression/decompression unit 1201 generates image data by subjecting the received compressed data into a decompression process, and outputs the generated image data to the face detection unit 1202 and the display unit 1206.

The data storage unit 1203 has regions for storing a plurality of pieces of face position information generated by the face detection unit 1202.

The control unit 1205, as is the case with Embodiment 1, includes an aperture/shutter driver, a zoom driver, and a focus driver. The control unit 1205 transmits to the monitoring camera 1001 via the transmission/reception unit 1200 (i) an instruction for performing imaging processes such as the focus adjustment, exposure adjustment, and white balance adjustment onto the main object selected by the selection unit 1204 and (ii) a piece of face position information that indicates a face region selected by the selection unit 1204.

The transmission/reception unit 1200 outputs the compressed data received from the monitoring camera 1001 via the network 1003, to the compression/decompression unit 1201.

4.3 Operation of Monitoring System 1000

Figure 21:
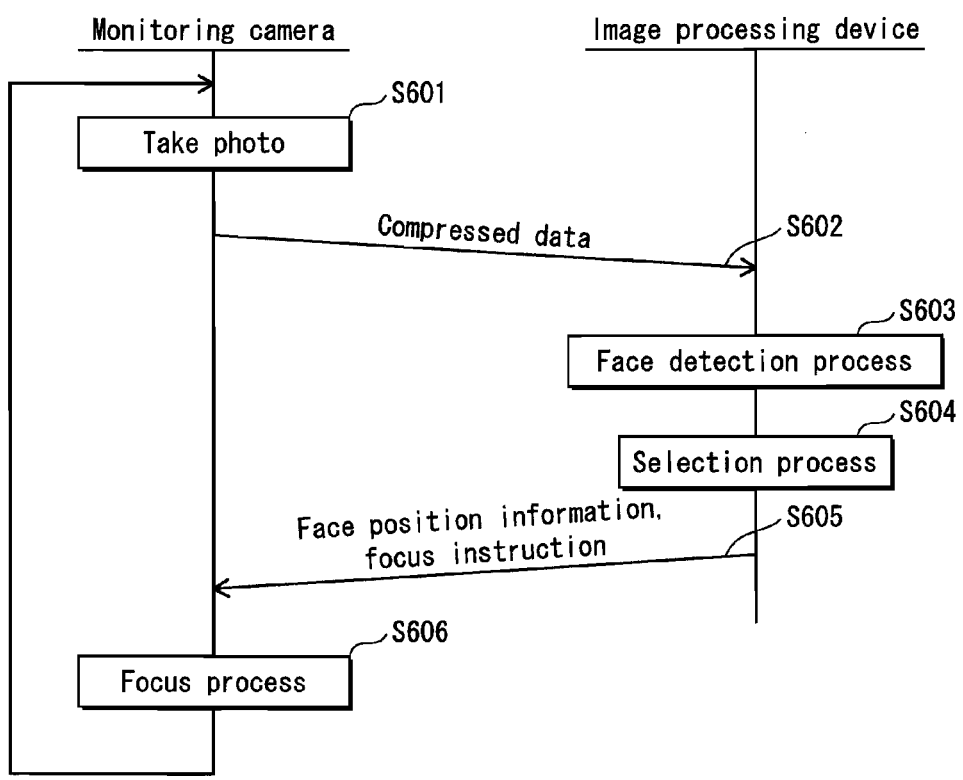
FIG. 21 is a flowchart showing the operational flow of the monitoring system 1000.

Described in the following with reference to the flowchart shown in FIG. 21 is an operation of the monitoring system 1000.

It is presumed here that, for example, a focus process for focusing is performed in the present example as an imaging process.

The monitoring camera 1001 takes a photo image (step S601), generates compressed data from image data of the photo image, and transmits the generated compressed data to the image processing device 1002 via the network 1003 (step S602).

Upon receiving the compressed data from the monitoring camera 1001 via the network 1003, the image processing device 1002 generates image data by decompressing the received compressed data. The image processing device 1002 causes the face detection unit 1202 to detect face regions by performing the face recognition process onto the generated image data (step S603).

After the face detection unit 1202 detect face regions, the image processing device 1002 causes the selection unit 1204 to select a main object by performing the selection process (step S604). Description of the selection process is omitted here since it is the same as the selection process in Embodiment 1.

The face detection unit 1202 transmits a focus instruction and a piece of face position information indicating a face region being the selected main object, to the monitoring camera 1001 via the network 1003 (step S605).

Upon receiving the focus instruction and the piece of face position information from the image processing device 1002 via the network 1003, the monitoring camera 1001 performs the focus process onto the face region indicated by the received piece of face position information (step S606).

4.4 Modification of Embodiment 40

In Embodiment 4, the selection unit 1204 is the same as the selection unit 152 of Embodiment 1. However, not limited to this, the selection unit 1204 may operate in the same manner as the selection unit 603 of Embodiment 2.

In Embodiment 4, the image processing device 1002 displays an image sent from the monitoring camera 1001. However, not limited to this, the image processing device 1002 may be a device for storing an image sent from the monitoring camera 1001.

5. Modifications

Up to now, the present invention has been described through several embodiments thereof. However, the present invention is not limited to these embodiments, but includes, for example, the following modifications.

(1) Each of the methods described above in the embodiments maybe, as a program that can be executed by a computer, transmitted by means of a storage device or a communication medium such as a network, and may be achieved by a computer which reads out the program from such a storage device or a communication medium, runs the program, and operates under control of the running program, where the storage device to store the program may be a magnetic disk (hard disk, floppy™ disk, etc.), an optical disc (CD-ROM, DVD-ROM, BD-ROM, etc.), or a semiconductor memory (SD card, Compact Flash™, USB memory, etc.).

(2) In Embodiment 1 described above, the imaging device assigns weights using all regions of the four judgment frames. However, the present invention is not limited to this.

The imaging device may assign weights using partial regions (of the four judgment frames) which each overlaps with a region of another judgment frame.

Here, the partial regions are, for example, partial regions 450, 451, 452, and 453 shown in FIG. 3. The partial regions 450, 451 are overlapping regions of the judgment frame 401 and two other judgment frames, respectively; and the partial regions 452, 453 are overlapping regions of the judgment frame 402 and two other judgment frames, respectively.

In this case, the imaging device judges, for each of the four partial regions one by one, whether the detected face region overlaps with a partial region. Upon judging that the detected face region overlaps with a partial region, the imaging device adds a weight constant, which corresponds to the overlapping partial region, to the evaluation value (wg).

(3) Embodiment 1 described above may be modified such that the four judgment frames are assigned weight constants a1 through a4, respectively, and that the partial regions 450, 451, 452, and 453 are assigned weight constants a5 through a8, respectively.

In this case, for example, the imaging device judges whether a face region, being a target of calculating an evaluation value, overlaps with a first judgment region, and upon judging that the face region overlaps with the first judgment region, further judges whether the face region overlaps with any of the partial regions 450 and 451. Upon judging that the face region overlaps with any of the partial regions 450 and 451, the imaging device adds a weight constant (a5 or a6), which corresponds to the overlapping partial region, to the evaluation value (wg). Upon judging that the face region does not overlap with any of the partial regions 450 and 451, the imaging device adds a weight constant (a1), which corresponds to the first judgment frame 401, to the evaluation value (wg).

Description of operations of the second through fourth judgment frames is omitted, since they are the same as the above-described flow of opration.

(4) In Embodiment 3 described above, the imaging device assigns weights to center points or eye positions after it assigns weights to face regions. However, the present invention is not limited to this.

The imaging device may assign weights to center points or eye positions instead of assigning weights to face regions.

(5) Embodiment 1 described above may be modified such that the face detection circuit 107 outputs, namely stores into the data storage unit 154, eye positions together with the face position information, and the selection unit 152 assigns weights to face regions by using the eye positions and the face position information.

In this case, the selection unit 152 calculates a first weight (wg) by assigning a position-based weight to a face region being a target of weight assignment, as is the case with Embodiment 1, and further calculates a second weight (wg') by assigning a position-based weight to an eye position of the face region. The selection unit 152 calculates an evaluation value (w) of the face region using the following equation:

$$\text{Equation} \ldots w = wg + wg'$$

It should be noted here that the evaluation value (w) of the face region may be calculated by multiplying the first weight (wg) by the second weight (wg').

The assignment of weights to face regions using the position information and eye position may be applied to Embodiment 2.

A nose position and/or the center point may be used instead of the eye position. Furthermore, two or more pieces of information among the eye position, nose position, and center point may be used.

(6) In the above-described Embodiments, as methods for assigning weights to the detected face regions, the position-based weighting and size-based weighting are described However, the present invention is not limited to these methods.

For example, evaluation values for the detected face regions may be calculated by the method of assigning weights based on the "faceness".

In this case, the face detection circuit stores values indicating levels of the faceness into the data storage unit, together with the face position information. The values indicating levels of the faceness are calculated based on the detected face regions, and the faceness values range, for example, from 0 to 255. The greater the faceness value is, the more the detected face region looks like a face. It should be noted here that the method of calculating the values indicating levels of the faceness is a known technology, and it is explained here merely briefly.

The imaging device preliminarily stores a plurality of pieces of outline data that are related to outlines of human faces. The face detection circuit performs a matching process by using the detected face regions and the preliminarily stored plurality of pieces of outline data. The face detection circuit obtains outline data that matches or resembles face outlines included in the detected face regions, and then calculates differences between the obtained outline data and the face outlines included in the detected face regions. The smaller the calculated difference is, the greater the value indicating the level of the faceness, namely closer to the value 255.

In the faceness-based weighting, the value indicating the level of the faceness may be used as the weight (wf). Alternatively, unique weights may be set such that the unique weights correspond to the faceness values on a one-to-one basis in an order where the greatest weight corresponds to the greatest faceness value and the smallest weight corresponds to the smallest faceness value.

For example, Embodiment 1 may be modified so that an evaluation value for a face region is calculated by adding a faceness-based weight (wfi) to a position-based weight (wpi). In this case, to calculate an evaluation value wi for an $i^{th}$ face region, the following equation is used:

$$wi = b \times wpi + c \times wfi; \text{ or}$$

$$wi = b \times wpi \times c \times wfi,$$

where "c" represents a constant.

As another example, Embodiment 2 may be modified so that an evaluation value for a face region is calculated by adding a faceness-based weight. In this case, an evaluation value wi for an $i^{th}$ face region is calculated by using the following equation when Equation 1 is applied:

$$wi = a \times wsi + b \times wpi + c \times wfi, \text{ and}$$

the evaluation value wi is calculated by using the following equation when Equation 2 is applied:

$$wi = a \times wsi \times b \times wpi \times c \times wfi,$$

where "c" represents a constant.

(7) The following describes one example of the weight assignment method explained in "2.1 Selection Unit 603" of Embodiment 2, in which the weight is assigned in accordance with the area of the overlapping portion of the detected face region and the judgment frames.

The position-based weighting unit 702 calculates a total sum of areas of overlapping portions of the first through fourth judgment frames and a face region that is a target of calculating a weighting coefficient, and uses the calculated total sum as the weight itself.

Alternatively, the position-based weighting unit 702 may set unique weights such that the unique weights correspond to the calculated total sums of areas on a one-to-one basis in an order where the greatest weight corresponds to the greatest total sum of areas.

It should be noted here that the weight may be assigned to the center point or the eye position as well in accordance with the area of the portion overlapping with the judgment frames.

(8) In the above-described embodiments, the target of detection is a human face. However, not limited to this, the detection target may be a face of an animal.

(9) Each of the above-described devices is specifically a computer system that includes a microprocessor, ROM, RAM, a hard disk unit and the like. A computer program is stored in the RAM or the hard disk unit. The microprocessor operates in accordance with the computer program and causes each device to achieve the functions. Here, the computer program is constructed as a combination of a plurality of instruction codes that issue instructions to the computer to achieve predetermined functions.

(10) Part or all of constituent elements constituting each of the above-described devices may be achieved in a system LSI (Large Scale Integration). The system LSI is an ultra multifunctional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

Each part of the constituent elements constituting each of the above-described devices may be achieved as one chip separately, or part or all of the constituent elements may be achieved as one chip.

It should be noted here that although the term "system LSI" is used here, it may be called IC, LSI, super LSI, ultra LSI or the like, depending on the level of integration. Also, the integrated circuit may not necessarily be achieved by the LSI, but may be achieved by the dedicated circuit or the general-purpose processor. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(11) The present invention may be methods shown by the above. The present invention may be a computer program that allows a computer to realize the methods, or may be digital signals representing the computer program.

Furthermore, the present invention may be a computer-readable recording medium such as a flexible disk, a hard disk, CD-ROM, MO, DVD, DVD-ROM, DVD-RAM, BD (Blu-ray Disc), or a semiconductor memory, that stores the computer program or the digital signal. Furthermore, the present invention may be the computer program or the digital signal recorded on any of the aforementioned recording mediums.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(12) The present invention may be any combination of the above-described embodiments and modifications.

6. SUMMARY

The present invention is achieved as an imaging device for converting a signal from an imaging element into an image and recording the image onto a recording device, the imaging device comprising: a face detection unit operable to detect a plurality of face regions from the image; a selection unit operable to assign weights to each of the detected face regions depending on overlapping of each face region with a region that divides the image by a golden ratio, and select one face region, that has a greatest weight, as a face portion of a main imaging object from among the plurality of face regions; and a control unit operable to perform predetermined controls, such as a focus adjustment and an exposure adjustment, onto the face region selected by the selection unit.

With the above-stated structure, when the face detection unit detects a plurality of face regions, the selection unit assigns weights to face regions that overlap with the golden section region on which the main object tends to be arranged in composition. This gives more chances of being selected as the main object to an object that is important in the layout of the image. With this structure, the control unit can perform appropriate controls onto the main object.

In the above-described imaging device, the golden section region, which is judged by the selection unit on whether being overlapping with each face region, maybe a region that is located between a section line dividing the image at a ratio of 1:2 through 2:3 in horizontal or vertical length of the image and a section line dividing the image at a ratio of 1:2 through 2:3 in horizontal or vertical length of the image.

With the above-stated structure, the judgment region can be detected as a region having a width, as well as a golden section line. This makes it possible to assign a weight to a face that is arranged to be slightly away from the golden section line in composition. With this structure, it is possible to handle the cases where the object is roughly arranged on the golden section region.

In the above-described imaging device, the face detection unit may detect center points or eye positions of the face regions, and the selection unit may judge whether the center points or eye positions overlap with the region that divides the image by the golden ratio.

With the above-stated structure, the imaging device can use composition information accurately.

In the above-described imaging device, weights based on faceness, which is a level of looking like a face, may be output in correspondence with the face regions detected by the face detection unit, and the selection unit may calculate a weight for each of the detected face regions, by combining a weight based on a size of the face region, a weight based on the faceness, and a weight based on overlapping with the golden section region.

With the above-stated structure, the imaging device can accurately select a face being a face portion of the main object.

Further, the present invention gives more chances of being selected as the main object to an object that is important in the layout of the image.

The present invention can be used effectively, namely repetitively and continuously, in the industry for manufacturing and distributing imaging devices or image processing devices.

The imaging device, image processing device, imaging device control method, and program include a process of assigning weight to a face that is arranged on a golden section region of the image, and performing the focus or exposure adjustment process onto the weight-assigned face by priority, which is useful as the object selection function performed in digital cameras and the like.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An imaging device that supports taking of an image with a suitable composition in accordance with a golden ratio, the imaging device comprising:
   an imaging mechanism operable to generate an image from incident light to satisfy a first imaging control condition;
   a storage unit storing at least one piece of region information each of which indicates a boundary region located, in an image frame, between two golden section lines determined by two types of golden ratios;
   a detection unit operable to detect one or more face regions, which are recognized as face portions of imaging objects, from the image generated by the imaging mechanism;
   a weighting unit operable to, when the detection unit has detected a plurality of face regions, assign weights to each of the detected face regions depending on overlapping of each face region with the boundary region indicated by the region information, and obtain an evaluation value of each of the face regions;
   a selection unit operable to select one face region as a face portion of a main imaging object from among the plurality of face regions, in accordance with the evaluation value of each of the face regions; and
   an imaging control unit operable to control the imaging mechanism to generate an image to satisfy a second imaging control condition that is determined according to the selected face region.

2. The imaging device of claim 1, wherein
   the weighting unit judges, for each of the detected face regions, whether a face region overlaps with the boundary region, and upon judging that the face region overlaps with the boundary region, calculates an evaluation value of the face region judged to overlap with the boundary region, using a weight constant corresponding to the boundary region, and
   the selection unit selects a face region corresponding to a largest evaluation value among the calculated evaluation values.

3. The imaging device of claim 2, wherein
   the weighting unit calculates the evaluation values by addition of the weight constant.

4. The imaging device of claim 2, wherein
the weighting unit calculates the evaluation values by multiplication of the weight constant.

5. The imaging device of claim 2, wherein
the weighting unit judges, for each of the detected face regions, whether a face region overlaps with the boundary region, and upon judging that the face region overlaps with the boundary region, calculate an area of the face region judged to overlap with the boundary region, and calculate an evaluation value of the overlapping face region in accordance with the calculated area of the overlapping face region.

6. The imaging device of claim 2, wherein
the selection unit judges whether there are a plurality of face regions that correspond to the largest evaluation value, and upon judging that there are not a plurality of face regions, selects one face region corresponding to the largest evaluation value, and
when the selection unit judges that there are a plurality of face regions that correspond to the largest evaluation value, namely when there are a plurality of face regions as candidates for the face portion of the main imaging object, the detection unit detects a center point of each of the detected face regions,
the weighting unit obtains a new evaluation value for each of detected center points by assigning a weight to a detected center point depending on a level of overlapping of each detected center point with the boundary region, and
the selection unit selects a face region corresponding to a largest new evaluation value among all of obtained new evaluation values.

7. The imaging device of claim 2, wherein
the selection unit judges whether there are a plurality of face regions that correspond to the largest evaluation value, and upon judging that there are not a plurality of face regions, selects one face region corresponding to the largest evaluation value, and
when the selection unit judges that there are a plurality of face regions that correspond to the largest evaluation value, namely when there are a plurality of face regions as candidates for the face portion of the main imaging object, the detection unit detects an eye position of each of the detected face regions,
the weighting unit obtains a new evaluation value for each of detected eye positions by assigning a weight to a detected eye position depending on a level of overlapping of each detected eye position with the boundary region, and
the selection unit selects a face region corresponding to a largest new evaluation value among all of obtained new evaluation values.

8. The imaging device of claim 1, wherein
the weighting unit includes:
a first obtaining subunit operable to obtain a first weight for each of the detected face regions, by calculating an area of each detected face region and assigning a weight to each detected face region according to the calculated area;
a second obtaining subunit operable to judge, for each of the detected face regions, whether a face region overlaps with the boundary region, and upon judging that the face region overlaps with the boundary region, obtain a second weight of the overlapping face region using a weight constant corresponding to the boundary region; and
a calculation subunit operable to obtain the evaluation value by using the first weight and the second weight, wherein
the selection unit selects a face region corresponding to a largest evaluation value among all of calculated evaluation values.

9. The imaging device of claim 8, wherein
the weighting unit calculates the evaluation value by using either a first equation: $w = a \times ws \times b \times wp$, or a second equation: $w = a \times ws + b \times wp$ wherein "a" represents a first constant, "b" represents a second constant, "ws" represents the first weight, and "wp" represents the second weight.

10. The imaging device of claim 9, wherein
the first weight is a calculated area of a detected face region.

11. The imaging device of claim 9, wherein
the first obtaining subunit assigns a different set value to each of a plurality of calculated areas of the detected face regions such that a larger area corresponds to a greater set value, and
the first weight is an assigned set value.

12. The imaging device of claim 1, wherein
the detection unit further obtains, for each of the detected face regions, a first value that indicates a level of faceness, which is a level of looking like a face,
the weighting unit judges, for each of the detected face regions, whether a face region overlaps with the boundary region, and upon judging that the face region overlaps with the boundary region, obtains a second value of the overlapping boundary region using a weight constant corresponding to the boundary region, and calculates evaluation values from the first value and the second value, and
the selection unit selects a face region corresponding to a largest evaluation value among all of calculated evaluation values.

13. The imaging device of claim 1, wherein
the golden ratio is a ratio between two successive numbers in a Fibbonacci series,
one of the two types of golden ratios is a ratio between values 1 and 2, and another one of the two types of golden ratios is a ratio between values 2 and 3, and
the boundary region is a region located between a first golden section line determined by a first golden ratio between values 1 and 2 and a second golden section line determined by a second golden ratio between values 2 and 3.

14. The imaging device of claim 1, wherein
the storage unit stores four pieces of region information,
the weighting unit judges, for each of boundary regions indicated by the four pieces of region information, whether a face region overlaps with any of the boundary regions, and upon judging that the face region overlaps with one or more boundary regions, calculates an evaluation value for the face region using weighting coefficients respectively corresponding to the one or more overlapping boundary regions.

15. The imaging device of claim 14, wherein
the golden ratio is a ratio between two successive numbers in a Fibbonacci series,
one of the two types of golden ratios is a ratio between values 1 and 2, and another one of the two types of golden ratios is a ratio between values 2 and 3, the storage unit stores, as the four pieces of region information, first region information, second region information, third region information, and fourth region information, the first region information indicates a first boundary region that is located between a golden section line dividing the image frame at a golden ratio of 1:2 in horizontal length of the image frame, and a golden section line dividing the image frame at a golden ratio of 2:3 in horizontal length of the image frame, the second region information indicates a second boundary region that is located between a golden section line dividing the image frame at a golden ratio of 2:1 in horizontal length of the image frame, and a golden section line dividing the image frame at a golden ratio of 3:2 in horizontal length of the image frame, the third region information indicates a third boundary region that is located between a golden section line dividing the image frame at a golden ratio of 1:2 in vertical length of the image frame, and a golden section line dividing the image frame at a golden ratio of 2:3 in vertical length of the image frame, and the fourth region information indicates a fourth boundary region that is located between a golden section line dividing the image frame at a golden ratio of 2:1 in vertical length of the image frame, and a golden section line dividing the image frame at a golden ratio of 3:2 in vertical length of the image frame.

16. An imaging processing device that supports taking of an image with a suitable composition in accordance with a golden ratio, the imaging device comprising:

a receiving unit operable to receive, from an external imaging device, an image that was generated from incident light to satisfy a first imaging control condition;

a storage unit storing at least one piece of region information each of which indicates a boundary region located, in an image frame, between two golden section lines determined by two types of golden ratios;

a detection unit operable to detect one or more face regions, which are recognized as face portions of imaging objects, from the image received by the receiving unit;

a weighting unit operable to, when the detection unit has detected a plurality of face regions, assign weights to each of the detected face regions depending on overlapping of each face region with the boundary region indicated by the region information, and obtain an evaluation value of each of the face regions;

a selection unit operable to select one face region as a face portion of a main imaging object from among the plurality of face regions, in accordance with the evaluation value of each of the face regions; and an imaging control unit operable to control an imaging mechanism to generate an image to satisfy a second imaging control condition that is determined according to the selected face region.

17. A control method for use in an imaging device that supports taking of an image with a suitable composition in accordance with a golden ratio, the imaging device including:

an imaging mechanism operable to generate an image from incident light to satisfy a first imaging control condition; and a storage unit storing at least one piece of region information each of which indicates a boundary region located, in an image frame, between two golden section lines determined by two types of golden ratios, and the control method comprising the steps of:

detecting one or more face regions, which are recognized as face portions of imaging objects, from the image generated by the imaging mechanism;

assigning, when the detection unit has detected a plurality of face regions, weights to each of the detected face regions depending on overlapping of each face region with the boundary region indicated by the region information, and obtaining an evaluation value of each of the face regions;

selecting one face region as a face portion of a main imaging object from among the plurality of face regions, in accordance with the evaluation value of each of the face regions; and controlling the imaging mechanism to generate an image to satisfy a second imaging control condition that is determined according to the selected face region.

18. A non-transitory computer-readable recording medium storing a program for use in an imaging device that supports taking of an image with a suitable composition in accordance with a golden ratio, the imaging device including:

an imaging mechanism operable to generate an image from incident light to satisfy a first imaging control condition; and a storage unit storing at least one piece of region information each of which indicates a boundary region located, in an image frame, between two golden section lines determined by two types of golden ratios, and the program causing a computer to perform steps comprising:

detecting one or more face regions, which are recognized as face portions of imaging objects, from the image generated by the imaging mechanism;

assigning, when the detection unit has detected a plurality of face regions, weights to each of the detected face regions depending on overlapping of each face region with the boundary region indicated by the region information, and obtaining an evaluation value of each of the face regions;

selecting one face region as a face portion of a main imaging object from among the plurality of face regions, in accordance with the evaluation value of each of the face regions; and controlling the imaging mechanism to generate an image to satisfy a second imaging control condition that is determined according to the selected face region.

* * * * *